(12) United States Patent
Clarke et al.

(10) Patent No.: US 6,993,445 B2
(45) Date of Patent: Jan. 31, 2006

(54) VORTEX FLOWMETER

(75) Inventors: David W. Clarke, Oxford (GB); Tarek Ghaoud, Oxford (GB)

(73) Assignee: Invensys Systems, Inc., Foxboro, MA (US)

( * ) Notice: Subject to any disclaimer, the term of this patent is extended or adjusted under 35 U.S.C. 154(b) by 392 days.

(21) Appl. No.: 09/921,293

(22) Filed: Aug. 3, 2001

(65) Prior Publication Data

US 2002/0129661 A1 Sep. 19, 2002

Related U.S. Application Data

(60) Provisional application No. 60/261,196, filed on Jan. 16, 2001.

(51) Int. Cl.
    *G01F 1/32* (2006.01)
(52) U.S. Cl. .......................... 702/106; 702/45; 702/48; 73/861.22
(58) Field of Classification Search ................. 702/12, 702/44, 45, 46, 47, 48, 49, 100, 106, 138, 702/189; 73/861.22–861.24
    See application file for complete search history.

(56) References Cited

U.S. PATENT DOCUMENTS

| | | | |
|---|---|---|---|
| 3,593,138 A * | 7/1971 | Dunn et al. .................. 375/211 |
| 3,709,034 A   | 1/1973 | Herzl ....................... 73/861.18 |
| 3,751,979 A * | 8/1973 | Ims .......................... 73/861.27 |
| 4,019,153 A * | 4/1977 | Cox, Jr. et al. ............. 331/1 A |
| 4,069,713 A   | 1/1978 | Gassmann ................. 73/861.28 |
| 4,123,940 A   | 11/1978| Herzl et al. ............... 73/861.27 |
| 4,185,498 A * | 1/1980 | Watson et al. ........... 73/861.27 |
| 4,201,084 A * | 5/1980 | Ito et al. ................... 73/861.22 |
| 4,270,391 A * | 6/1981 | Herzl ....................... 73/861.22 |
| 4,446,744 A * | 5/1984 | Bearcroft .................. 73/861.28 |
| 4,463,612 A * | 8/1984 | Thompson ................ 73/861.22 |
| 4,809,558 A * | 3/1989 | Watson et al. ........... 73/861.22 |
| 5,003,827 A   | 4/1991 | Kalinoski et al. ........ 73/861.24 |
| 5,029,004 A * | 7/1991 | Shibayama ................. 348/625 |
| 5,072,195 A * | 12/1991| Graham et al. ................ 331/2 |
| 5,128,625 A * | 7/1992 | Yatsuzuka et al. .......... 327/156 |
| 5,152,005 A * | 9/1992 | Bickley ........................ 455/76 |
| 5,152,174 A * | 10/1992| LaBudde .................. 73/861.02 |

(Continued)

FOREIGN PATENT DOCUMENTS

GB              1551220         8/1979

(Continued)

OTHER PUBLICATIONS

William F. Egan, Chapter 9: Acquisition Aids, Phase-Lock Basics, Johm Wiley & Sons, Inc., 1998, pp. 209-210 and 222-227.*

(Continued)

*Primary Examiner*—Hal Wachsman
*Assistant Examiner*—Jeffrey R. West
(74) *Attorney, Agent, or Firm*—Fish & Richardson P.C.

(57) ABSTRACT

A process variable transmitter, implemented in a dual PLL structure, includes a first PLL having a first bandwidth producing a first output signal, and a second PLL having a second bandwidth narrower than the first bandwidth of the first PLL. The first and second PLLs are operable to lock into a frequency of an input signal and produce first and second output signals, respectively. The second PLL is operable to lock into the frequency of the input signal with greater accuracy and greater immunity to noise than the first PLL. A switch is operable to switch an output signal of the process variable transmitter between the first output signal and the second output signal.

31 Claims, 19 Drawing Sheets

U.S. PATENT DOCUMENTS

| | | | | |
|---|---|---|---|---|
| 5,414,390 A * | 5/1995 | Kovacs et al. | ................. | 331/2 |
| 5,429,001 A | 7/1995 | Kleven | .................... | 73/861.22 |
| 5,493,915 A * | 2/1996 | Lew et al. | ............... | 73/861.24 |
| 5,502,711 A * | 3/1996 | Clark et al. | ............. | 369/59.17 |
| 5,551,307 A * | 9/1996 | Kane et al. | ............ | 73/861.356 |
| 5,570,300 A * | 10/1996 | Henry et al. | ................. | 702/45 |
| 5,576,497 A * | 11/1996 | Vignos et al. | ........... | 73/861.22 |
| 5,583,300 A | 12/1996 | Green et al. | ............. | 73/861.24 |
| 5,710,720 A * | 1/1998 | Algrain et al. | .............. | 700/280 |
| 5,774,378 A | 6/1998 | Yang | .......................... | 702/104 |
| 5,804,740 A | 9/1998 | Kalinoski et al. | ........ | 73/861.24 |
| 5,942,696 A | 8/1999 | Kleven | .................... | 73/861.22 |
| 6,170,338 B1 | 1/2001 | Kleven et al. | ........... | 73/861.22 |
| 6,211,742 B1 * | 4/2001 | Tan et al. | ...................... | 331/25 |
| 6,215,834 B1 * | 4/2001 | McCollough | ............... | 375/375 |
| 6,236,278 B1 * | 5/2001 | Olgaard | ....................... | 331/25 |
| 6,298,100 B1 * | 10/2001 | Bouillet | ...................... | 375/326 |
| 6,311,136 B1 | 10/2001 | Henry et al. | .................. | 702/45 |
| 6,408,011 B1 * | 6/2002 | Nakatsugawa | .............. | 370/503 |
| 6,438,177 B1 * | 8/2002 | Ikeda | ......................... | 375/316 |
| 6,466,069 B1 * | 10/2002 | Rozenblit et al. | ........... | 327/157 |
| 6,505,519 B2 | 1/2003 | Henry et al. | ........... | 73/861.356 |
| 6,507,791 B2 | 1/2003 | Henry et al. | .................. | 702/45 |
| 2001/0008364 A1 * | 7/2001 | Ku | ................................ | 331/2 |
| 2003/0028334 A1 | 2/2003 | Ghaoud et al. | ................ | 702/45 |

FOREIGN PATENT DOCUMENTS

| | | | |
|---|---|---|---|
| JP | 08075516 A | * | 3/1996 |
| JP | 11274922 A | * | 10/1999 |

OTHER PUBLICATIONS

William F. Egan, "Chapter 9: Acquisition Aids," Phase-Lock Basics, John Wiley & Sons, Inc., 1998, pp. 209-210 and 222-227.*

"General Metrology—Part 3: Guide to the Expression of Uncertainty in Measurement (GUM)," Published Document PD 6461-3:1995, British Standards, Jan. 15, 1995, pp. 1-105.*

Wood, Robert H., et al., "A Phase-Locked Loop for Driving Vibrating Tube Diameters," *Rev. Sci. Instrum.*, vol. 60, No. 3, Mar. 1989, pp. 493-494.

Kutin, Jože, et al., "Phase-Locking Control of the Coriolis meter's Resonance Frequency Based on Virtual Instrumentation," *Sensors and Actuators A: Physical*, 2003, pp. 86-93.

Kline, S.J., and McClintock, F.A., "Describing Uncertainties in Single-Sample Experiments," *Mechanical Engineering*, Jan. 1953, pp. 3-8.

"Test Uncertainty: ASME PTC 19.1-1998 Instruments and Apparatus" The American Society of Mechanical Engineers, An American National Standard, Performance Test Codes, pp. iii-ix and 1-112.

Yang, Janice Ching-Yi, "Self-Validating Sensors," Doctoral Thesis, University of Oxford, 1993, 210 pages.

Henry, M.P., and Clarke, D.W., "The Self-Validating Sensor: Rationale, Definitions and Examples," *Control Eng. Practice*, vol. 1, No. 4, pp. 585-610, 1993.

Henry, M.P., et al., "A Self-Validating Digital Coriolis Mass-Flow Meter: An Overview," *Control Engineering Practice*, vol. 8, 2000, pp. 487-506.

Clarke, D.W., and Fraher, P.M.A., "Model-Based Validation of a DOx Sensor," *Control Eng. Practice*, vol. 4, No. 9, pp. 1313-1320, 1996.

Clarke, D.W., and Ghaoud, T., "Validation of Vortex Flowmeters," *IEEE Computing and Control Engineering Journal*, Oct. 2002, pp. 237-241.

Clarke, D.W., "Designing Phase-Locked Loops for Instrumentation Applications," *Measurement*, vol. 32, 2002, pp. 205-227.

Ghaoud, T., and Clarke, D.W., "Modelling and Tracking a Vortex Flow-Meter Signal," *Flow Measurement and Instrumentation*, vol. 13, 2002, pp. 103-117.

Clarke, D.W., and Ghaoud, T., "A Dual Phase-Locked Loop for Vortex Flow Metering," *Flow Measurement and Instrumentation*, vol. 14, Nos. 1-2, 2003, pp. 1-11.

Yang, Janice C.-Y., and Clarke, David W., "A Self-Validating Thermocouple," *IEEE Transactions On Control Systems Technology*, vol. 5, No. 2, Mar. 1997, pp. 239-253.

"Specification for Data Quality Metrics for Industrial Measurement and Control Systems," *British Standard BS 7986:2001*, Jul. 15, 2001, pp. 1-23.

* cited by examiner

VORTEX FLOWMETER

CROSS-REFERENCE TO RELATED APPLICATIONS

This application claims priority from U.S. Provisional Application No. 60/261,196, filed Jan. 16, 2001, and titled VORTEX FILTER, which is incorporated by reference.

TECHNICAL FIELD

This invention generally relates to digital and analog flowmeters.

BACKGROUND

Flowmeters provide information about materials being transferred through a conduit. For example, a flowmeter may provide a direct indication of the velocity and volume of the material being transferred through the conduit. Mass flowmeters measure the mass of the material, and density flowmeters measure the density of the material.

One type of flowmeter is a vortex-shedding meter, or vortex flowmeter. Vortex flowmeters operate using techniques based on a vortex shedding phenomenon known as the Karman effect. In the vortex flowmeter, a bluff body is placed in the conduit (e.g., a pipe) in the path of the material passing through the conduit. The bluff body sheds Karman vortices in its wake. These vortices cause fluctuating pressure variations that then are amplified and processed. The frequency of the Karman vortices is directly proportional to the flow rate of the material, as are the pressure variations occurring during vortex generation.

To produce a flow measurement, the flowmeter first determines the vortex shedding frequency, $\omega_v$, in rad/sec. The flowmeter also converts the reading into a flow, f, in units of 1/sec, through use of $f = K_m \omega_v$, where $K_m$ is the appropriate meter factor. This meter factor $K_m$ (or K-factor) relates the frequency of generated vortices to the flow rate.

Conventional vortex flowmeters can accurately measure the vortex shedding frequency down to a threshold low flow rate of material passing through the conduit. Below this threshold, accuracy of conventional measurement becomes unreliable. This primarily results because the amplitude of the vortex shedding pressure is much smaller at low flow rates, such that the signal is much noisier due to harmonic components caused by pressure pulsations from, for example, the impeller blades of the pump(s). Therefore, at low flow rates, the decreased amplitude of the vortex shedding pressure and the increased effect of noise on the measurement system lead to greater uncertainties in the flow rate measurement and/or slower determinations of flow rate.

SUMMARY

Techniques are provided for improving the accuracy of flow rate measurement over a greater range of flow rates. In particular, the techniques permit flow meters to measure low flow rates as well as medium and high flow rates with greater accuracy and speed.

In one implementation, a process variable transmitter includes a vortex flowmeter using multiple phase-locked loops (PLL). In particular, the flowmeter may include a first PLL having a first bandwidth producing a first output signal, and a second PLL having a second bandwidth narrower than the first bandwidth of the first PLL. The first and second PLLs are operable to lock into a frequency of an input signal and produce first and second output signals, respectively. The second PLL is operable to lock into the frequency of the input signal with greater accuracy and greater immunity to noise than the first PLL.

Implementations may include one or more of the following features. For example, the process variable transmitter may include a switch operable to switch an output signal of the process variable transmitter between the first output signal and the second output signal. The second PLL may generate a lock indicator signal when the second PLL is locked into the frequency of the input signal, and the switch may switch between the first output signal and the second output signal based on a status of the lock indicator signal.

One or both of the PLLs may include a phase sensitive detector operable to receive the input signal and to produce a detector output signal, a loop filter operable to receive the detector output signal and to produce a filtered signal, and a voltage controlled oscillator operable to receive the filtered signal and to produce an oscillator signal. The phase sensitive detector may be further operable to receive the oscillator signal as a feedback signal of the PLL. It should be noted that the switch and each of the phase sensitive detector, the loop filter and the voltage controlled oscillator of at least one of the first and second PLLs may be implemented in a software process. Also, the switch and each of the phase sensitive detector, the loop filter and the voltage controlled oscillator of at least one of the first and second PLLs may be implemented in the software process on a single digital signal processor chip.

The phase sensitive detector, or phase sensitive detectors, each may include a Hilbert transformer. Moreover, the input signal may be heterodyned with a known frequency before the input signal reaches the Hilbert transformer.

The process variable transmitter further may include an amplitude detector operable to sense an amplitude of the input signal and to generate a low flow signal when the amplitude of the input signal is below a user-controlled value. Additionally, the process variable transmitter may include a pre-filter operable to filter the input signal prior to processing by at least one of the first PLL and the second PLL. Based on a status of the low flow signal from the amplitude detector, a fixed center frequency of, for example, the second PLL may be switchable between the first output signal and $2\pi f_{ph}$, where $f_{ph}$ is a high cut-off frequency of the pre-filter. The pre-filter may be switchable between an ON state and an OFF state.

The process variable transmitter may include a self-validating module operable to generate validated uncertainty parameters including a measurement value and an uncertainty value relating to the quality of the measurement value. The validated uncertainty parameters generated by the self-validating module may include a measurement status variable. The self-validating module may be implemented in a software process.

In another implementation, a vortex flowmeter may include a flow sensor operable to sense pressure variations due to vortex-shedding of a fluid in a passage and to convert the pressure variations to a flow sensor signal in the form of an electrical signal having sinusoidal characteristics. This particular implementation also may include a signal processor operable to receive the flow sensor signal and to generate an output signal corresponding to the pressure variations due to vortex-shedding of the fluid in the passage. The signal processor may include PLLs having different characteristics from each other and operable to receive the flow sensor signal, to lock onto the flow sensor signal, and to produce PLL output signals indicative of the flow sensor signal. The signal processor also may include a switch for switching the output signal generated by the signal processor from among the PLL output signals. As an example, the signal processor may be implemented by a software process in a digital signal processor chip.

One of the PLLs (a "first" PLL) may be operable to lock onto the flow sensor signal faster than any other PLL, and another one of the PLLs (a "second" PLL) may be operable to lock onto the flow sensor signal with greater accuracy and greater immunity to noise than the first PLL. The switch may be operable to switch the output signal generated by the signal processor from an output signal of the first PLL to an output signal of the second PLL when the second PLL locks onto the flow sensor signal. When so implemented, the first PLL will attain lock quickly and ensure some stability during start-up and large transients, whereas the more accurate second PLL will ensure higher accuracy and better tracking of the vortex signal (and hence a better evaluation of the flowrate of the material through the passage).

The vortex flowmeter also may include an amplitude detector operable to detect an amplitude of the flow sensor signal and to generate a low flow signal when the amplitude of the flow sensor signal is below a user-controlled value. Additionally, a filter may be included to filter the flow sensor signal prior to processing by the second (slower, yet more accurate) PLL. This filter may be switchable between an ON state and an OFF state, and is switched to the ON state based on the low flow signal from the amplitude detector.

One particular method of determining a flow rate sensed by a vortex flowmeter may include inputting to a signal processor an input signal having sinusoidal characteristics. The signal processor may include a first PLL having a first bandwidth and a second PLL having a second bandwidth narrower than the first bandwidth. The method may include locking into the frequency of the input signal using the first PLL, which has a fast loop filter having a large natural frequency to enable the first PLL to lock quickly into the frequency of the input signal. Next, the method may include locking into the frequency of the input signal accurately using the second PLL, which has a slow loop filter having a small natural frequency to enable the second PLL to lock into the frequency of the input signal more accurately and with greater immunity to noise than the first PLL. A lock indicator signal may be generated when the second PLL is locked into the frequency of the input signal.

Based on the lock indicator signal, an output of the signal processor may be switched between an output signal produced by the first PLL and an output signal produced by the second PLL. Switching the output of the signal processor includes switching the output of the signal processor from the output signal of the first PLL to the output signal of the second PLL when the lock indicator signal indicates that the second PLL is locked into the frequency of the input signal. Additionally, the output of the signal processor may be switched from the output signal of the second PLL to the output signal of the first PLL when the lock indicator signal indicates that the second PLL is out of lock with the frequency of the input signal.

The output signal of the first PLL may be provided to the second PLL as an initial condition frequency of the second PLL to assist lock-in by the second PLL.

One implementation of a signal processing apparatus for acquiring a frequency of an input signal may include a first PLL having a first bandwidth and operable to lock into the frequency of the input signal. The signal processing apparatus also may include a second PLL having a second bandwidth narrower than the first bandwidth and operable to lock into the frequency of the input signal with greater accuracy and greater immunity to noise than the first PLL. A switch may be provided to receive signals from the first PLL and the second PLL and to switch therebetween to generate an output signal.

Additionally, the signal processing apparatus may include a self-validating module operable to generate validated uncertainty parameters including a measurement value corresponding to the output signal and an uncertainty value relating to the quality of the measurement value. The validated uncertainty parameters generated by the self-validating module may include a measurement status variable.

The multiple PLLs can be interpreted as providing a narrow band-pass filter around the vortex shedding frequency. The noise-rejection performance of the multiple PLLs is designed to give the same or better noise-rejection performance than conventional vortex signal processors at the minimum flow rate of the vortex flowmeter. The bandwidth of conventional vortex signal processors varies with the flow rate, giving best noise-rejection performance at minimum flow rate. As the flow rate increases, however, the bandwidth of conventional vortex signal processors increases and the noise-rejection performance is degraded. Note that the vortex signal has high SNR at high flow rates, so that having a narrow band-pass filter in high flow rates is not as important as in low flow rates, where the SNR is low. The multiple (e.g., dual) PLL approach, however, provides the same noise-rejection performance of conventional vortex signal processors in the minimum flow-rate (or even better) over the full range of operation of the flowmeter (i.e., the bandwidth of the dual PLL filtering is independent of the flow rate). Therefore, some of the benefits of using dual PLLs instead of the conventional vortex signal processors include: better precision in high and low flow rates, significant improvement in the tracking performance, and extending the turn-down ratio of the vortex flowmeter.

The details of one or more implementations are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

Improvements to vortex flowmeter signal processing in both digital and analog implementations are provided.

Figure 1:
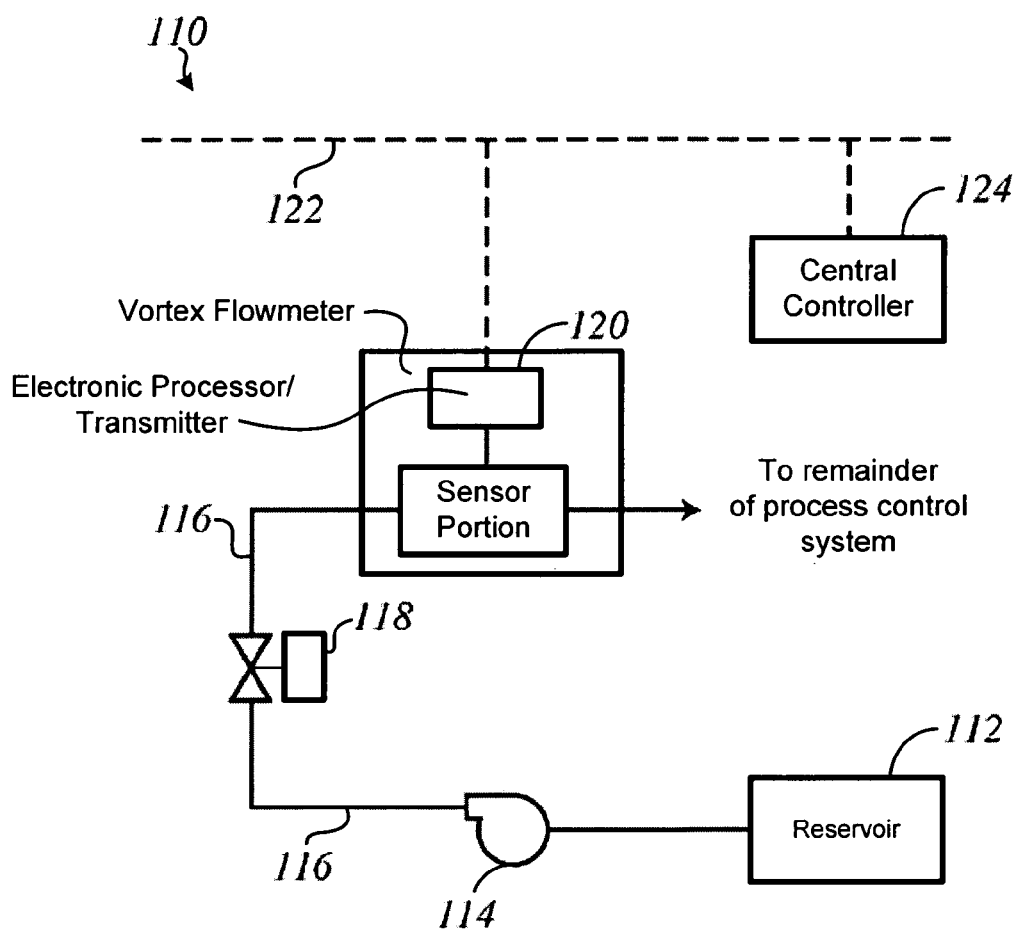
FIG. 1 is a diagram illustrating an exemplary structure of a process control system including a vortex flowmeter.

FIG. 1 illustrates a simplified process control system 110, or flow rig, which is one implementation in which the vortex flowmeter can be used. The flow rig 110 may include a reservoir 112, a pump (e.g., a centrifugal pump) 114, conduit portions 116 (e.g., pipes having a 2 inch diameter), a valve 118 to control the flow rate, and a vortex flowmeter 120. Various other process control devices or field devices may be included in the process control system 110, depending on the specific process control application. Furthermore, the process control system 110 may include a communication network 122 for monitoring and controlling the various devices of the process control system 110.

The communication network 122 can be implemented using a typical two-wire communication configuration. The communication network 122 can provide analog (e.g. 4–20 mA signals), digital, and/or pulse output communications. A central controller 124 may be provided for remote monitoring and control of the devices connected to the process control system 110. The central controller 124 may include a computer workstation with a graphical user interface for facilitating interaction between humans and the process control system 110.

In the simplified implementation depicted in FIG. 1, the control system 110 may provide typical feedback control of a process. For example, the pump 114 may be controlled (e.g., from a signal generated at the central controller 124) to pump the material through the conduit portions 116 at a rate that depends on the measured flow rate sensed by the vortex flowmeter 120. The vortex flowmeter 120 may output to the central controller 124 a signal representing the flow rate of the material through the conduit portions 116. Accordingly, the central controller 124 may control the pump 114 based on the programmed parameters for controlling and monitoring the specific process control system 110.

Figure 2:
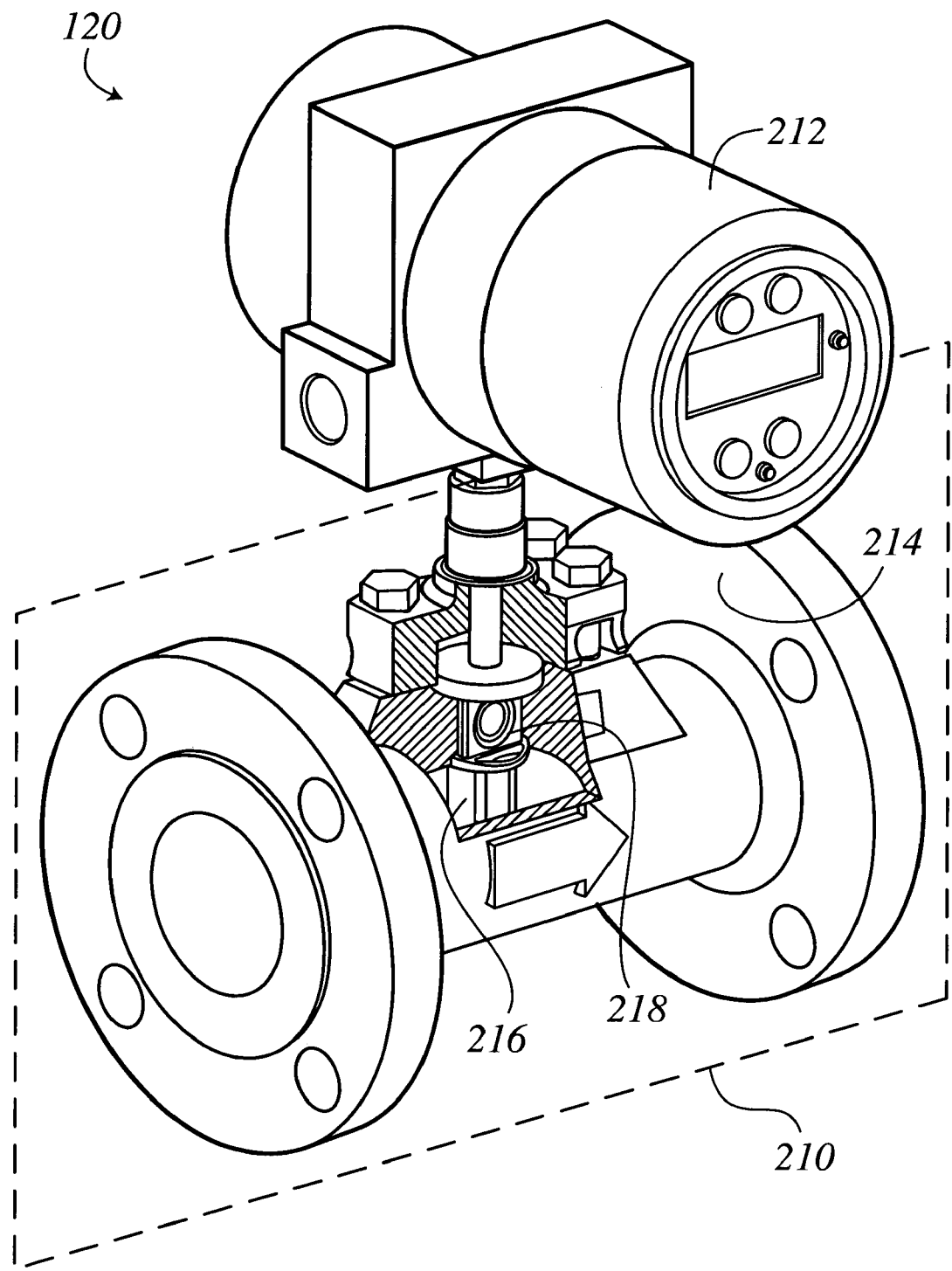
FIG. 2 is a diagram illustrating a basic structure of the vortex flowmeter of FIG. 1.

Turning now to FIG. 2, an implementation of the vortex flowmeter 120 may include a sensor portion 210 and an electronic processor/transmitter module 212. The sensor portion 210 may include a flow tube (e.g., a conduit-mating body) 214 for installation in coaxial alignment with the conduit portions 116. The sensor portion 210 may further include a bluff body 216 positioned to interact with the material flowing through the conduit portions 116. Additionally, the sensor portion 210 may include a vortex pressure sensor 218 for sensing the fluctuating pressure of the vortices shed by the bluff body 216 as the material flows past the bluff body in the conduit portions 116. This vortex pressure sensor 218 may be implemented using a piezoelectric sensor element or some other pressure sensitive element.

The electronic processor/transmitter module 212 may include electronics for filtering and processing the signal received from the sensor portion 210. The electronic processor/transmitter module 212 may be implemented using one or more of, for example, a digital signal processor (DSP), a field-programmable gate array, an ASIC, other programmable logic or gate arrays, or programmable logic with a processor core. The electronic processor/transmitter module 212 generates a measurement of flow rate through the conduit portions 116 based at least on signals received from the vortex pressure sensor 218. The electronic processor/transmitter module 212 also may include electronics for transmitting through the communication network 122 a data signal representing, among other things, the flow rate of the material flowing through the conduit portions 116. The electronic processor/transmitter module 212 can include electronics capable of filtering, processing, and transmitting digital and/or analog signals. Likewise, the central controller 124 can receive and process digital and/or analog signals sent from the various process control devices (e.g., the vortex flowmeter 120).

In one implementation, the signal from the vortex pressure sensor 218 can be converted into a digital signal by an analog-to-digital converter (ADC). The digital signal then can be provided to a DSP that implements the electronic processor/transmitter module 212. Accordingly, all of the processing and transmission of the vortex flowmeter can be accomplished digitally. Of course, the vortex flowmeter also can be implemented in an all-analog or mixed analog-and-digital design.

It should be recognized that the above-described control system 110 can include, for example, additional sensors, transmitters, power supplies, and central controllers. Moreover, the communication network 122 can conduct digital, analog and pulse communications among the various devices connected to it, and can supply power to the various connected devices (e.g., the vortex flowmeter).

For a typical vortex sensor signal sent from the sensor portion 210, the vortex shedding data y(t) is modeled as a sinewave of amplitude $A_0$, angular frequency $\omega_\iota$ and with additive band-limited noise n(t):

$$y(t) = A_0 \sin \omega_\iota t + n(t),$$

where $\omega_i$ is the frequency to be determined. With this model, it is assumed that $\omega_\iota \propto f$; the flow rate (though at low-flow rates the usual fluid-mechanical corrections need to be made); $A_0 \propto f^2$,—a well-known fluid-mechanical result—though saturation of the electronics which transduce and amplify the electrical signal corresponding to the pressure fluctuations might affect this at high flow rates; and n(t) is statistically consistent for a given flow regime, though it would probably increase significantly from low to high flow rates, and it is expected that the signal:noise ratio (SNR) improves as flow increases. The first assumption is common with all vortex flowmeters, the second is invoked mainly for low flow rates, and the third is needed to determine the resulting accuracy of the method but does not affect the basic design.

Figure 3A:
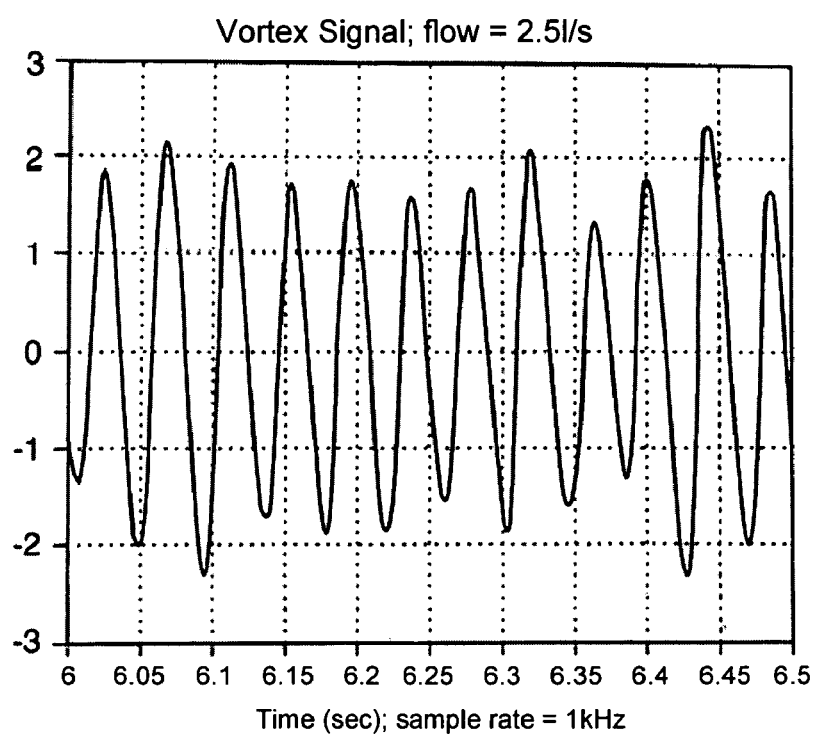
FIGS. 3A–3C are graphs illustrating typical vortex frequency data signals.
Figure 3B:
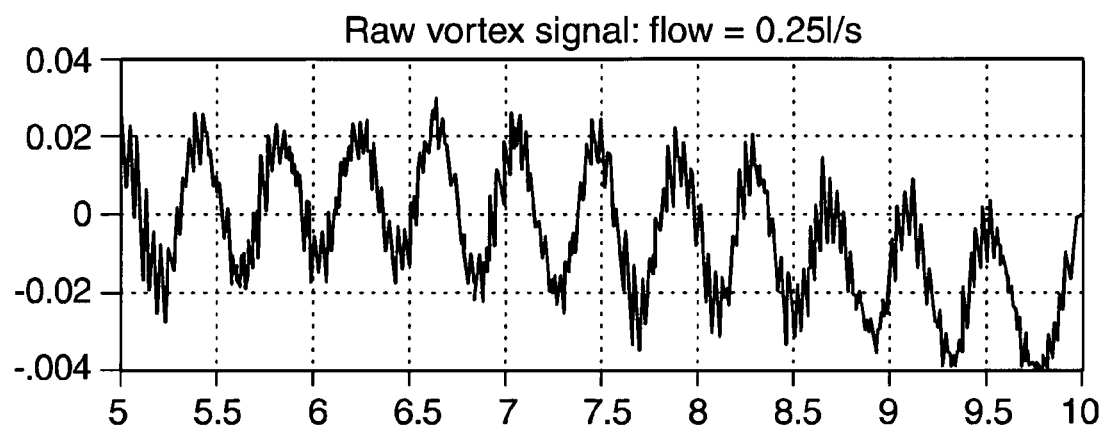
Figure 3C:
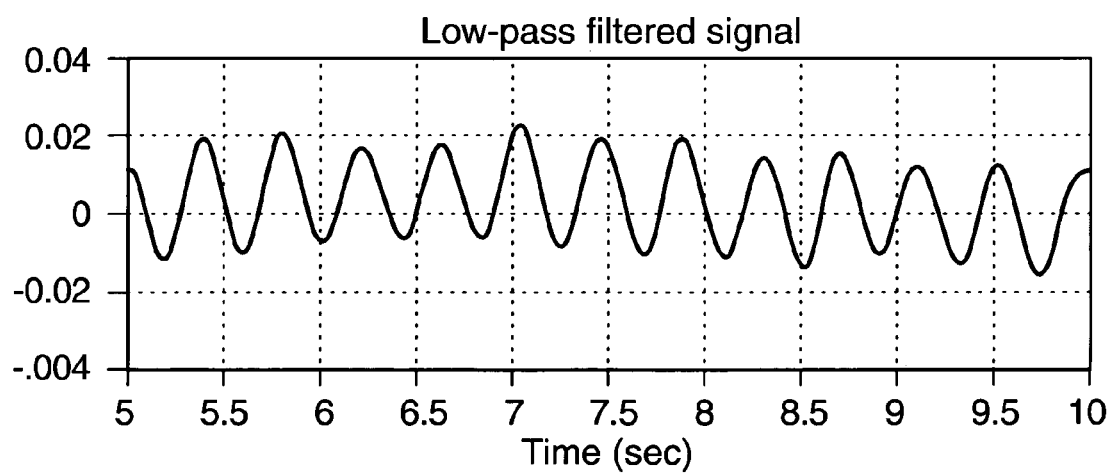

FIGS. 3A–3C illustrate some of the difficulties of measuring the vortex frequency. In particular, FIGS. 3A–3C show vortex shedding (pressure) data recorded from a typical flow rig with a pipe of nominal 2 in. diameter and in which the flow is driven by impeller pumps.

FIG. 3A shows 0.5 seconds of data corresponding to a (medium) flow rate of 2.5 l/sec, acquired at a sampling rate of 1 kHz. Some conventional vortex flowmeters have been known to use peak or zero-crossing counting methods to calculate the vortex shedding frequency. In FIG. 3A, the vortex frequency is about 24 Hz, which can be determined by counting peaks or zero-crossings. The signal shown in FIG. 3A can be characterized as a sine wave with varying amplitude and frequency (note, for example, the variations in the time between peaks and zero-crossings).

The frequency estimates from zero-crossing methods have a corresponding amount of "jitter," that result in uncertainties in the flow measurement. However, averaging the frequency estimates over a number of periods may reduce this jitter to an acceptable amount. For example, if the vortex frequency is about 24 Hz, and flow data are to be provided every two seconds, then this will involve averaging over 48 periods of the waveform, which gives a reduction in variance of 48 and in standard deviation of about 7. In general, this means that conventional vortex flowmeters using simple zero-crossing techniques will yield acceptable flow data only at high flow rates.

FIG. 3B illustrates a raw signal of a smaller flow rate of only 0.25 l/s, which is below the cut-off flow rate for most of the standard vortex flowmeters, where a standard vortex flowmeter is unable to measure accurately a flowrate below the cut-off point of a standard vortex flowmeter. It should be noted that the amplitude of the vortex shedding is much smaller (by a factor of 100) than the signal shown in FIG. 3A, and that the signal is much noisier (e.g., from harmonic components caused by pressure pulsations from the impeller blades of the pump). A zero-crossing method would produce erroneous results due to spurious crossings caused by the noise. A zero-crossing method with hysteresis (such as in a Schmitt trigger) would remove the errors, though great care would be needed in the design of the hysteresis bandwidth because of the slow variations in the mean level which can cause the signal to move totally below or above zero (note the data around 9.5 sec in FIG. 3B).

One approach is to use a low-pass (or band-pass) filter, which can lead to the data in the graph of FIG. 3C. The band-pass filter can be an adaptive filter using the measured vortex shedding frequency to establish the filter frequency settings. The basic intent of the adaptive filter is to establish and maintain a band-pass whose low frequency cut-off is half of the vortex shedding frequency and whose high cut-off is twice the vortex shedding frequency. However, failure of the zero-crossing process correctly to measure the frequency causes the band-pass filter to be presented with an incorrect center frequency. This induces further errors in frequency estimation, and lock is lost. Hence, zero-crossing processes have difficulty acquiring and retaining a measurement at low flow-rates. Therefore meters using zero-crossing methods have a minimum guaranteed flow rate.

Notwithstanding that the data looks 'clean' in FIG. 3C, the long-term variations may still cause problems with a zero-crossing method. Moreover, as the frequency is now only 2.4 Hz (due to the lower flow rate), the method of averaging data to give accurate estimates will take 10 times longer (e.g., 20 seconds for the same averaging effect discussed above with respect to the data in FIG. 3a). The fundamental problem with a zero-crossing method is that it uses information at only 2 (or 3) points per period, whereas inspection of FIG. 3C shows that data is available over the entire period.

PHASE-LOCKED LOOPS

Another method of tracking sinewaves in noise uses a phase-locked loop (PLL). The objective of a PLL is to synchronize the frequency of a locally generated signal with that of an incoming signal. Data carried by the incoming signal, either in terms of frequency or amplitude variations, then can be accessed even if there is significant noise. The use of a PLL can be interpreted as narrow-band filtering around the locked frequency. Locking into the frequency is achieved by using a feedback loop, which uses the phase differences between the signals as the error.

It is important to note that the PLL does not look at zero-crossings. Rather, the PLL looks for a sine wave that may be masked in the raw signal with the raw signal's spurious crossings caused by the noise. Essentially, the PLL transforms a raw data signal, for example, as shown in FIG. 3b, to a smooth data signal, for example, as shown in FIG. 3c.

Figure 4:
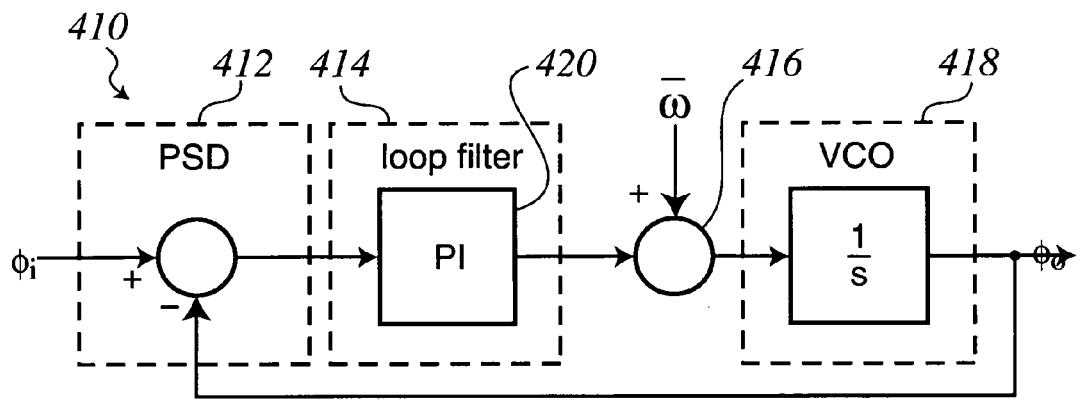
FIG. 4 is a diagram illustrating a basic structure of a phase-locked loop (PLL).

FIG. 4 illustrates an example of the basic structure of a PLL 140. The PLL 410 includes a phase sensitive detector (PSD) 412 (also referred to as a phase-shift detector), a loop filter 414, a nominal center frequency input node 416, and a voltage-controlled oscillator (VCO) 418. The PSD 412 provides a signal $e = \phi_\iota - \phi_o$, which is the phase error between the input sine wave $A_0 \sin \phi_\iota(t)$ and the locally generated sine wave $\sin \phi_o(t)$. The loop filter 414 is the "controller" part of the PLL feedback loop that tries to ensure that e is small (hopefully zero). When e is small or zero, the PLL 410 is said to be "in lock" and the generated sine wave $s_o(t)$ has the same frequency as the incoming sine wave $s_i(t)$.

The loop filter 414 may include a proportional-plus-integral (PI) controller 420, which gives a second-order closed-loop with natural frequency $\omega_n$. This natural frequency $\omega_n$ essentially determines the bandwidth of the PLL, and is used to describe the natural frequency of the PLL.

Furthermore, the value of $\omega_n$ is a key design parameter: a "large" value of $\omega_n$ yields fast tracking (e.g., during changing flow rates), but low accuracy and bad results for low flow rates.

The VCO 418 generates a sine wave with the frequency proportional to the input voltage. The term "VCO" is merely suggestive of the analog electronic implementation. Indeed, the VCO 418 may be implemented in a software process for a digital signal processor (DSP). In the digital case, the VCO output is simply generated by a "sin" function in the DSP chip that implements the overall process.

Finally, the signal $\bar{\omega}$ added in at the nominal center frequency input 416 exists to provide a nominal center frequency so that a sine wave is generated on start-up of the PLL and so that lock-in will be relatively quick.

Vortex shedding frequency data have the following attributes, which are known to cause problems with digital and analog "standard" PLLs:

The vortex shedding frequency varies linearly with the flow rate. These variations can be as much as 100:1, depending on the size of the flowmeter, as shown in Table 1. This is a relatively large range compared to standard PLL ranges (typically 1:1.5) and hence it is difficult to tune the PLL to have a small $\omega_n$.

TABLE 1

Flow rate and frequency range of the existing vortex flowmeter

| Nominal pipe-line size (inch) | Flow rate ran (l/s) | Frequency range (Hz) |
|---|---|---|
| 0.75 | 0.07–2.1 | 14–400 |
| 1 | 0.1–3.6 | 8–300 |
| 1.5 | 0.15–8.8 | 3–180 |
| 2 | 0.19–14.7 | 2–135 |
| 3 | 0.47–32.2 | 1.5–90 |
| 4 | 0.89–56.7 | 1–70 |
| 6 | 2.4–130 | 0.8–46 |
| 8 | 4.6–228 | 0.7–34 |
| 10 | 8.1–372 | 0.6–26 |
| 12 | 12.5–540 | 0.55–22 |

The frequency of vortex shedding has typical values of 0.5–400 Hz. This means a small value of $\omega_n$ is required to minimize the 2nd harmonic introduced by the PSD of an analog multiplier PLL, particularly at the lowest frequency of 0.5 Hz, where $\omega_n$ should be much smaller than $\omega_\iota$ rad/s of vortex shedding. Standard PLLs operate most successfully at much higher frequencies (e.g., 100 MHz).

The amplitude of the vortex shedding varies with the flow rate as $A_0 = \alpha Q^2$. These variations are in the order of 20000:1. The analog multiplier PLL suffers from tuning problems of the PI controller, as the loop gain of the analog multiplier PLL depends on the amplitude of the incoming signal.

The vortex shedding signal is contaminated with other frequency harmonics generated by the pump impeller and pipe-line vibrations. The amplitude of these harmonics at low flow rates can be significant compared to the vortex shedding amplitude, as shown by the lower trace in FIG. 5, and can cause the PLL to lock into the wrong signal. Indeed the SNR for vortex shedding can be as low as 1:10 (e.g., for a flow of 0.1 l/s).

A PLL can lose lock and cause spurious measurements when input data are excessively noisy or rapidly changing. These typical problems associated with vortex flowmeters have inhibited the use of analog and/or digital PLLs in commercial instruments such as the vortex flowmeter. Moreover, many standard PLLs are noise-sensitive and can cause "false-lock" (i.e., the PLLs can lock into harmonics of the incoming signal).

Hilbert Transformer Phase-Sensitive Detector

To avoid false-lock, give fast lock-in and ensure reliable behavior independent of flow amplitude, the PSD 412 may be modified to include a Hilbert transformer. In more detail, one of the roles of the PSD 412 in the PLL structure is to produce an error signal e(t) as the difference between the phase of the incoming signal $\phi_\iota$ and the phase of the PLL output signal $\phi_o$. Assuming that the incoming signal is $s_\iota(t) = A_0 \sin \phi_i$, where $A_0$ is its amplitude, and the output of the PLL 410 is $s_o(t) = \sin \phi_o$, then using trigonometry, the error signal $(\phi_\iota - \phi_o)$ can be produced as follows:

$x = A_0 \sin \phi_\iota \cos \phi_o - A_0 \cos \phi_\iota \sin \phi_o = A_0 \sin(\phi_\iota - \phi_o);$ $y = A_0 \cos \phi_i \cos \phi_o + A_0 \sin \phi_i \sin \phi_o = A_0 \cos(\phi_\iota - \phi_o);$ and $$e(t) = (\phi_i - \phi_o) = \arctan\left(\frac{x}{y}\right) = \arctan\left(\frac{\sin\phi_i \cos\phi_o - \cos\phi_i \sin\phi_o}{\cos\phi_i \cos\phi_o - \sin\phi_i \sin\phi_o}\right).$$

Accordingly, a PSD may be designed to produce an error signal $(\phi_\iota - \phi_o)$, that is independent of the amplitude $A_0$ of the incoming signal. However, for this type of PSD to work properly, a 90° phase-shifter is required to convert $A_0 \sin \phi_\iota$ to $-A_0 \cos \phi_\iota$. While designing a phase-shifter for a known frequency is a relatively simple task, designing a phase-shifter to cover the large range of frequencies required by vortex flowmeters (e.g., 100:1) is a more difficult task.

A 90° phase-shifter is simply a filter that has an output with 90° phase shift over a range of frequencies without affecting the amplitude of the input signal. One way to design a PSD having a 90° phase-shifter is to use a Hilbert transformer. A discrete Hilbert transformer has a non-causal pulse response:

$$h(n) = \frac{2}{\pi}\frac{\sin^2(\pi n/2)}{n}, n = \pm 1, \pm 2, \cdots ; = 0, n = 0$$

The discrete Hilbert transformer has a 90° phase shift, as its pulse response is an odd function with each element $h(n)z^{-n}$ having a corresponding $-h(n)z^n$. The frequency response of the Hilbert transformer is:

$h(n)e^{-jn\omega} - h(n)e^{jn\omega} = -j2h(n)\sin n\omega,$ with a frequency response of the Hilbert transformer $H(e^{j\omega})$ converging to $-j$ for $0 \leq \omega \leq \pi$ and $j$ for $\pi \leq \omega < 0$.

Figure 6:
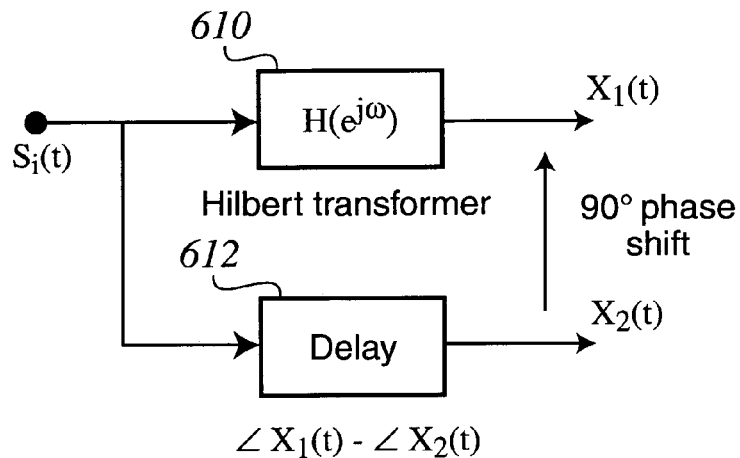
FIG. 6 is a diagram illustrating a basic structure of a Hilbert transformer.

To produce a practical Hilbert transformer, the frequency range is defined in terms of the normalized frequency, which is defined as $f_\iota/f_N$, where $f_\iota$(Hz) is the frequency of the incoming signal and $f_N$(Hz) is the Nyquist frequency (half the sampling frequency). Over the normalized frequency range, approximations to the magnitude response of the Hilbert transformer, with unity gain, can be obtained by using, for example, the remez function in Matlab®'s signal processing toolbox. The remez function finds a best-fit (equi-ripple) to the desired magnitude response for a specified length of coefficients m and specified normalized frequency range $[\beta_1 \ldots \beta_2]$, and then computes the corresponding parameters h(n). Note that the remez function tends to produce the maximum error at the transition normalized frequencies $\beta_1=0$ and $\beta_2=1$. When m is even, the process produces |H(0)|=0 and |H(1)|=0. When m is odd, however, the process produces |H(0)|=0 and |H(1)|=1. As shown in FIG. 6, causality can be imposed by passing the incoming signal through the approximated Hilbert transformer 610 having length m and through a delay 612 of length equal to m/2, so that the phase shift between their outputs $x_1(t)$ and $x_2(t)$ is 90°.

Figure 7:
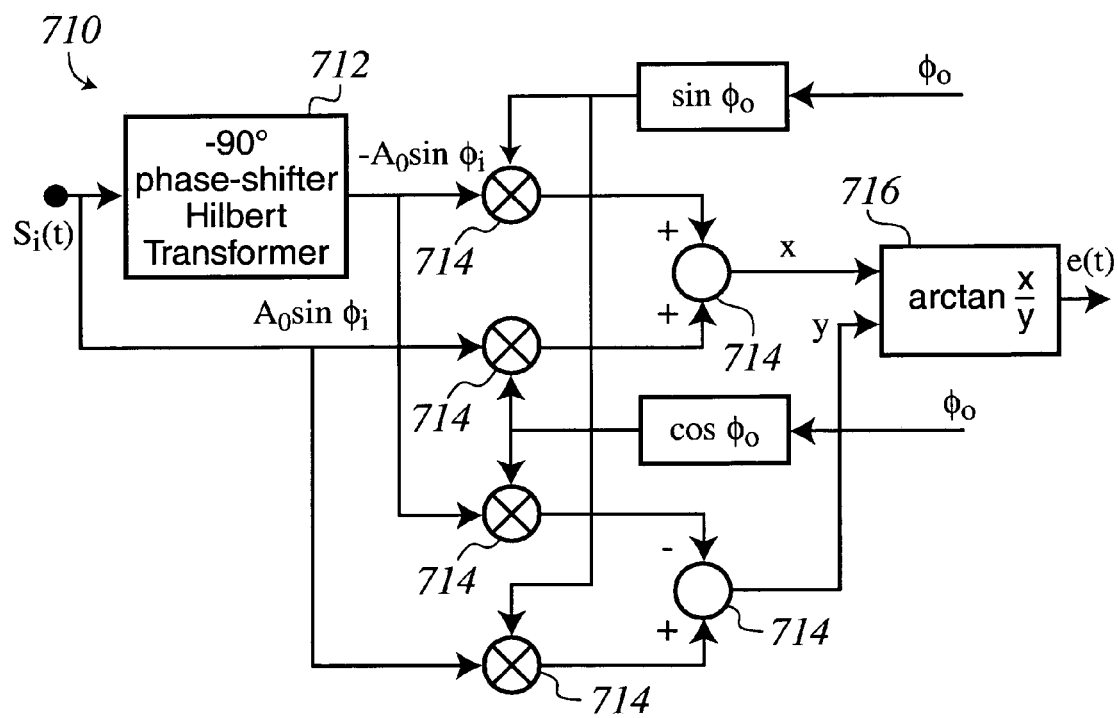
FIG. 7 is a diagram illustrating one implementation of a Hilbert transformer phase sensitive detector.

One implementation of a Hilbert transformer PSD (HTPSD) is shown in FIG. 7. The HTPSD 710 can be structured such that the input signal $s_t(t)$ is applied to the Hilbert transformer 712 (90° phase-shifter). The input signal $s_t(t)$ also is applied to one of several trigonometric function nodes 714. Also input to the HTPSD 710 is the signal $\phi_o$ generated by, for example, VCO 418 of FIG. 4, where $\phi_o$ is transformed into components sin $\phi_o$ and cos $\phi_o$. All of these signals are operated on by the various trigonometric function nodes 714 as shown, to produce the error signal output e, which corresponds to $e=\phi_i-\phi_o$. It should be recognized that the above-described HTPSD 710 can be substituted for the PSD 412 of FIG. 4. Furthermore, the HTPSD 710 can be digitally implemented with software in a DSP.

The HTPSD 710 shown in FIG. 7 has several advantages over standard analog and digital PLLs. First, the HTPSD is linear over the range of $-\pi \ldots \pi$. Second, the time for lock-in is about 8 times faster than a traditional analog PLL and about 1.33 times faster than a traditional digital PLL, for all $\omega_n$. Third, the response of error e is essentially independent of the amplitude $A_0$ of the incoming signal. Fourth, a ripple-free estimate of the input amplitude $A_0$ is readily computable. Fifth, there is no second or higher harmonic component in the output e, when the loop is in lock. This is particularly useful in avoiding false-lock and in presenting a "clean" signal for the frequency estimate, but is true only if the phase-shifter has unity gain over the frequencies involved.

Note that the implementation of the HTPSD 710 in FIG. 7 uses an "arctan" function 716 to achieve proper 4-quadrant operation. Note further that the addition of a Hilbert transformer 712 and of the trigonometric function nodes 714 add to the computational burden of the DSP or other components. As such, the number of coefficients m may need to be quite small for fast operation. This may be accomplished if the designed frequency range is restricted. Indeed, proper operation of this PSD is dependent on the Hilbert transformer 712 design. The phase shift is always correct, but the amplitude errors caused by truncation of m may induce second-harmonics in the PSD output e.

Heterodyning

Notwithstanding the numerous advantages of HTPSDs as described above and shown in FIG. 7, at least two problems may be encountered by using Hilbert transformers. First, a typical Hilbert transformer can cope with a frequency range of only about 1:30 with a good degree of accuracy while many coefficients m may be required for a large frequency range (recall that vortex shedding frequency range may be as much as 100:1). Second, the magnitude response of the HTPSD is much more difficult to design at low frequencies, such that the HTPSD becomes amplitude-dependent, which may lead to second harmonics in the loop.

It is possible to overcome these problems by using heterodyning, by which the input frequencies are shifted to a higher range at which the HTPSD operates more effectively. For example, heterodyning the incoming signal $s_i(t) = A_0 \sin \phi_i$ involves multiplying $s_i(t)$ by another signal $s_h(t) = \cos \omega_h t$, where $\omega_h$ (rad/s) is a known frequency. This modulates the waveform to give two sidebands at $\omega_h \pm \omega_i$.

Figure 8:
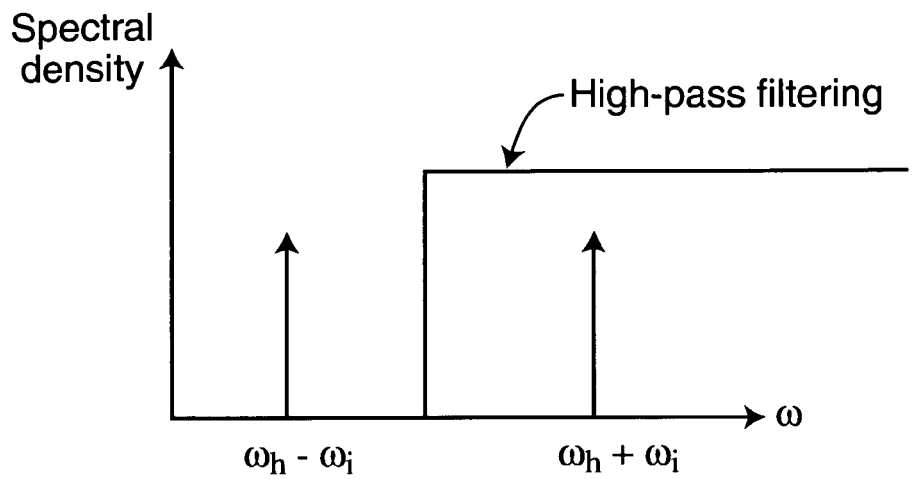
FIG. 8 is a graph illustrating spectral density of a signal after heterodyning.

Then, as shown in FIG. 8, a high-pass filter $H_h(s)$ is used to filter out the low frequency component $(\omega_h-\omega_i)$, leaving the data with frequency $\omega_h+\omega_i$ for the PLL to act upon. Finally, after lock-in by the PLL, the known frequency $\omega_h$ is subtracted to obtain the measured frequency.

Figure 9:
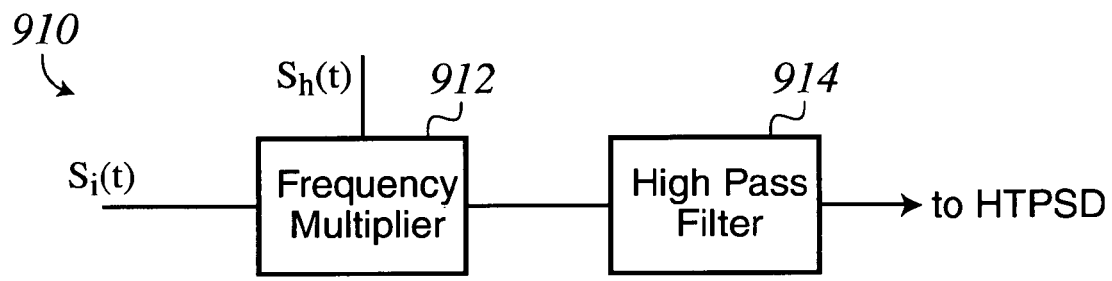
FIG. 9 is a diagram illustrating a simplified implementation of a heterodyne module.

FIG. 9 shows an implementation of a heterodyning module 910. As shown, the heterodyning module 910 includes a frequency multiplier 912 and a high pass filter 914. Heterodyning can be accomplished by inserting the heterodyning module 910 into the structure of the HTPSD 710 of FIG. 7 at a point before the signal $s_t(t)$ reaches the Hilbert transformer 712.

Figure 10:
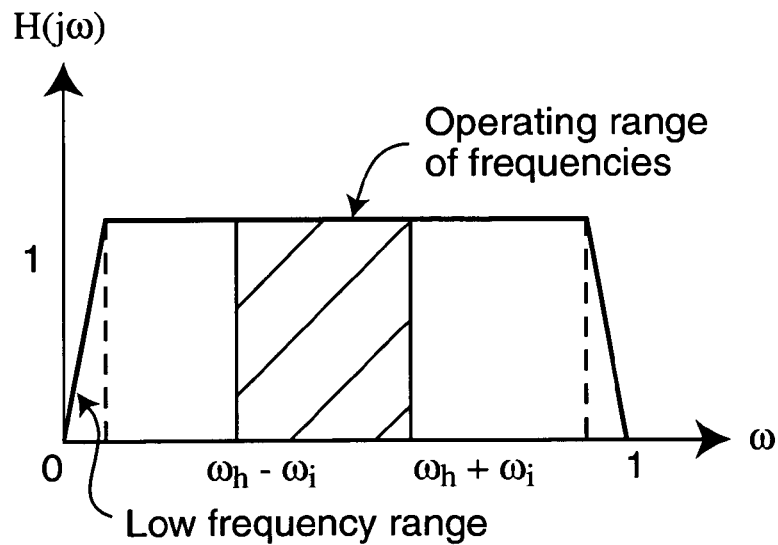
FIG. 10 is a graph illustrating design criteria for a Hilbert transformer receiving a heterodyned input signal.

Heterodyning the signal $s_t(t)$ gives:

$$s_i(t)s_h(t) = \frac{A_0}{2}(\sin((\omega_i - \omega_h)t + \Phi) - \sin((\omega_i + \omega_h)t + \Phi)),$$

where $\Phi$ is a constant phase shift. Referring to FIG. 10, a Hilbert transformer design must be produced for the signal $\sin((\omega_t+\omega_h)t+\Phi)$ instead of $s_t(t)$ as discussed above with reference to FIG. 7. Again, note that the known frequency $\omega_h$ is subtracted from the frequency estimate of the PLL to obtain the frequency of interest $\omega_t$.

An example of a condition for selecting an appropriate heterodyning frequency $\omega_h$ is that $\omega_h$ may be chosen so that $\omega_h >> \omega_{t,min}$ and $\omega_h \geq \omega_{i,max}$, which gives a Hilbert transformer design for a range of normalized frequencies:

$$\frac{\omega_{i,max} + \omega_h}{\omega_{i,min} + \omega_h} \approx \frac{\omega_{i,max} + \omega_h}{\omega_h} \leq 2.$$

Therefore, with heterodyning, Hilbert transformers are designed for a smaller range of frequency variations with a maximum ratio of approximately 2:1, as compared to the case without heterodyning for which the frequency range of variations could be as much as 100:1.

Figure 11:
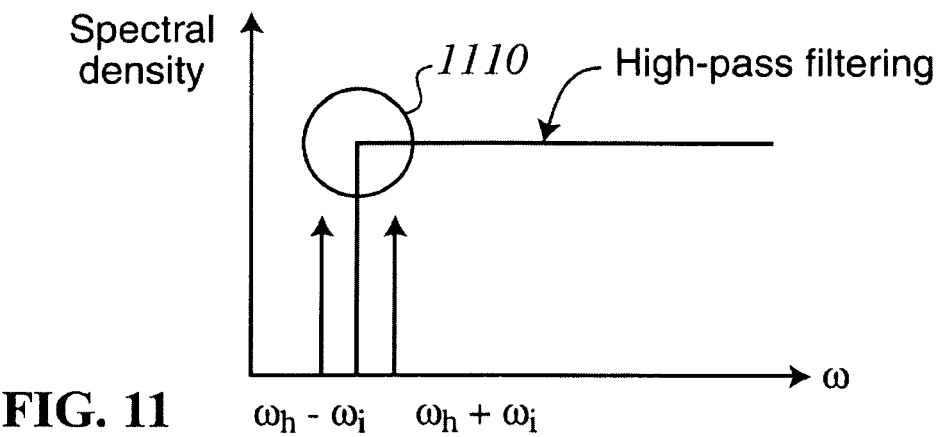
FIG. 11 is a graph illustrating high-pass filtering of a high frequency component of a heterodyned vortex signal corresponding to a low flow rate.

The high pass filter 914 can be designed at the minimum frequency of vortex shedding $\omega_{t,min}$. The low and high frequency components $(\omega_h-\omega_t)$ and $(\omega_h+\omega_t)$ are very close together, as also shown in FIG. 11. Accordingly, the high-pass filter 914 may be designed with a very sharp roll-off 1110 to optimally attenuate the low frequency signal, as also shown in FIG. 11. For example, the cut-off frequency $\omega_{ch}$ of the high-pass filter 914 can be half way between $\omega_h-\omega_{t,min}$ and $\omega_h+\omega_{t,min}$ (i.e., equal to the heterodyning frequency $\omega_h$).

Furthermore, assuming a proper design is used to implement the high-pass filter 914, then the heterodyning of the input signal $s_t(t)$ by the heterodyning module 910 has little or no effect on the SNR of the input signal $s_t(t)$.

Multiple PLL Structure and Process

Figure 12:
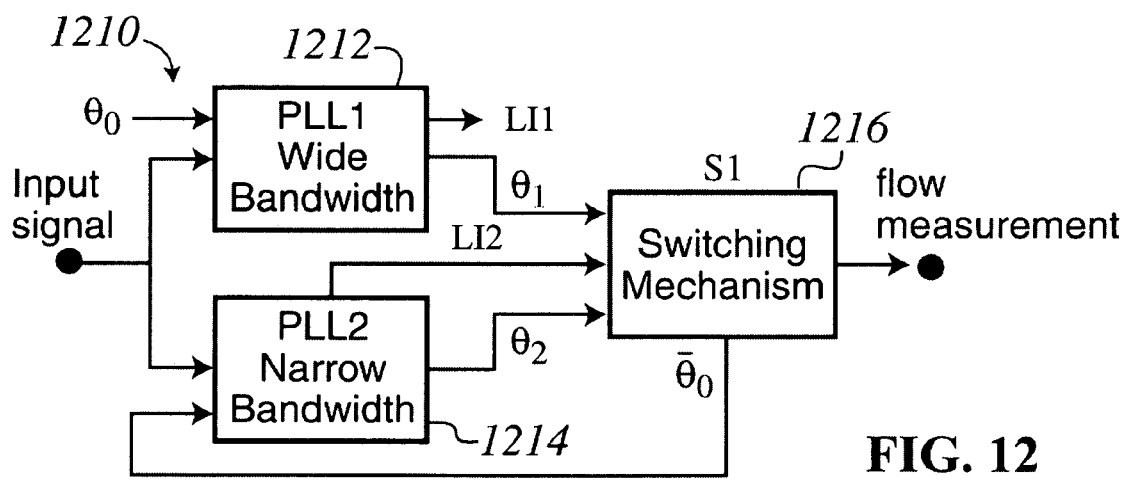
FIG. 12 is a diagram illustrating an implementation of a vortex signal processor using two PLL modules.

Returning now to the two major competing issues of PLL design, i.e., fast-tracking of the input signal and high accuracy, it should be noted that it is difficult to improve one without degrading the other. In other words, the natural frequency $\omega_n$ of the PLL 410 (i.e., the loop filter 414) produces different results depending on its value, i.e., a large $\omega_n$ gives fast-tracking, low accuracy, and the inability to stay in lock under high noise conditions, and a small $\omega_n$ gives high accuracy and greater immunity to noise but has a very long lock-in time. This problem can be overcome by using a multiple PLL structure. In one implementation of a multiple PLL structure, this problem, as it relates to vortex frequency measurement, can be overcome by using, for example, a dual PLL structure, in which each PLL uses a HTPSD, as shown in FIG. 12. It should be recognized that the following description of the dual PLL structure adapts quite readily to multiple PLL structures having more than two PLLs, with only minor modifications that will be understood by one skilled in the art.

Bandwidths of the Multiple PLL

FIG. 12 illustrates an implementation of a dual PLL 1210, that includes a first PLL (PLL1) 1212, a second PLL (PLL2) 1214, and a switching mechanism 1216 for switching between the outputs $\theta_1$ and $\theta_2$ of PLL1 1212 and PLL2 1214, respectively. PLL1 1212 has a large natural frequency $\omega_n$ for fast tracking from start-up, for example to lock into the input signal within 1 second. In other words, PLL1 1212 may be designed to take account of start-up and transients by having a large bandwidth $\omega_{n1}$. PLL2 1214, by contrast, has a small natural frequency $\omega_n$ for high accuracy and the ability to stay in lock even at low SNR. It should be noted that the dual PLL 1210 shown in FIG. 12 may be implemented in hardware or completely by a software process in a DSP chip.

The center frequency of PLL1 1212 may be simply $\theta_0$ (i.e., $f_0$), which is normally fixed to half way in the frequency range of the vortex flowmeter. Moreover, PLL2 1214 may be designed to have a small bandwidth $\omega_{n2}$, to provide high accuracy (precision) in constant flow rates, which improves the uncertainty of the flow measurements. The center frequency of PLL2 1214, when out-of-lock, can be input with $\theta_1$ (the frequency estimate of PLL1 1212), so that PLL2 1214 is brought into lock with the help of PLL1 1212. Because of the small bandwidth $\omega_{n2}$, PLL2 1214 would take a very long time to track transients with large slew-rates, and more importantly, PLL2 1214 alone might take a very long time to lock onto the signal in start-up, which is the reason PLL1 1212 is needed.

The switching mechanism 1216 can be designed to take the measurements (frequency estimate $\theta_1$) of PLL1 1212 during start-up of the vortex flowmeter and during transients. When the flow rate is constant or varying with small slew-rates, however, the switching mechanism 1216 can take the measurements (frequency estimate $\theta_2$) of PLL2 1214 and hence give a more accurate estimate of the flow rate. The switching conditions can be achieved by a careful design of a lock-indicator LI2 of PLL2 1214, so that, for example, LI2 indicates a signal '1' if PLL2 1214 is locked and '0' when PLL2 1214 is out-of-lock. The lock indicator LI2 may be designed to be slow and sure to indicate lock-in but fast in deciding that PLL2 1214 is out-of-lock. Moreover, once LI2 indicates lock, the switching mechanism 1216 can switch the center frequency of PLL2 1214 to a fixed value $\theta_0$ (i.e., $f_0$).

The dual PLL 1210 shown in FIG. 12 may be implemented by a processor employing two natural frequencies ($\omega_n$). The bandwidth $\omega_{n1}$ of PLL1 1212 may be designed for fast tracking, whereas the bandwidth $\omega_{n2}$ of PLL2 1214 may be designed for high accuracy (precision). The choice of the bandwidth $\omega_{n2}$ may be based on the precision performance of the vortex flowmeter 120 of FIG. 1 at the minimum flow rate. In other words, the accuracy of PLL2 1214 may be designed so that the signal-to-noise ratio SNR, from PLL2 1214 is greater than or equal to the signal-to-noise ratio $SNR_0$ of a conventional vortex flowmeter at a minimum flow-rate (e.g., the vortex shedding frequency corresponds to 0.5 Hz). For example, $\omega_{n2}$ may be at most 2 rad/s to satisfy this design criterion.

The choice of the bandwidth $\omega_{n1}$, however, may be based on the start-up performance of the vortex flowmeter 120.

Figure 13:
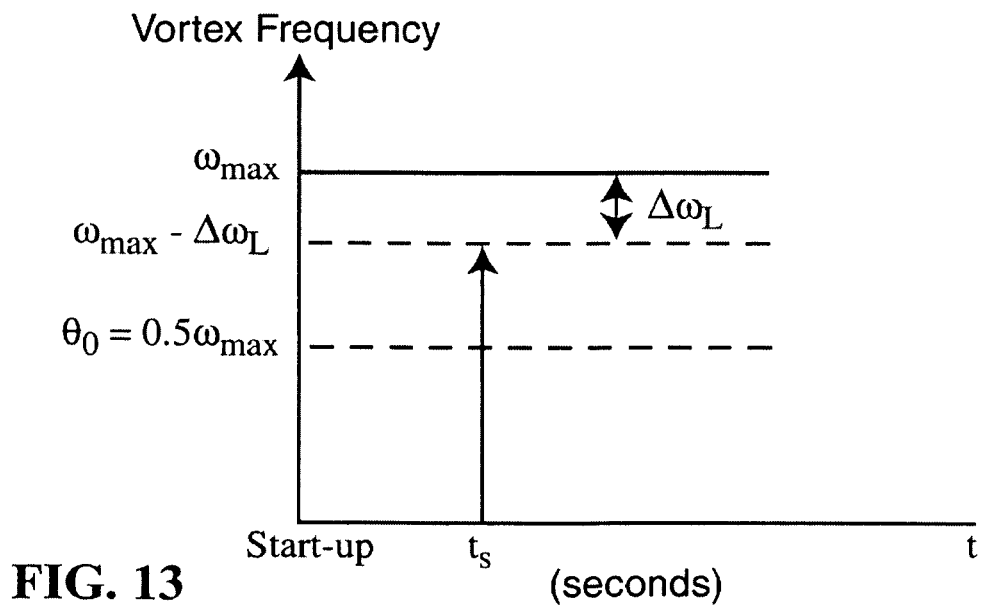
FIG. 13 is a graph illustrating a start-up criterion of the vortex flowmeter design of FIG. 12.

The design choice may assume that the pump 114 of FIG. 1 starts the flow as a step, and considering the worst possible scenario, may also assume that the flow starts as a step to the maximum flow rate $\omega_{max}$ as shown in FIG. 13. The center frequency $\theta_0$ of PLL1 1212 may be half way between the maximum and minimum frequency of the vortex shedding. Hence $\theta_0 \approx \omega_{max}/2$. One manner of selecting the design criterion, therefore, is to make the start-up time $t_s \leq T$ (where, for example, T=1), so that the frequency estimate is within the lock-in range $\Delta\omega_L \approx 1.35\pi\omega_{n1}$. Accordingly:

$$t_s = \frac{3}{4\pi^2} \frac{\Delta\omega^2}{\omega_{n1}^3} = \frac{3}{4\pi^2} \frac{(\omega_{max}/2 - 1.35\pi\omega_{n1})^2}{\omega_{n1}^3} \leq T$$

and the bandwidth of PLL1 1212 may be approximately:

$$\omega_{n1} \geq \left(\frac{3\omega_{max}^2}{16\pi^2 T}\right)^{1/3}.$$

Figure 14:
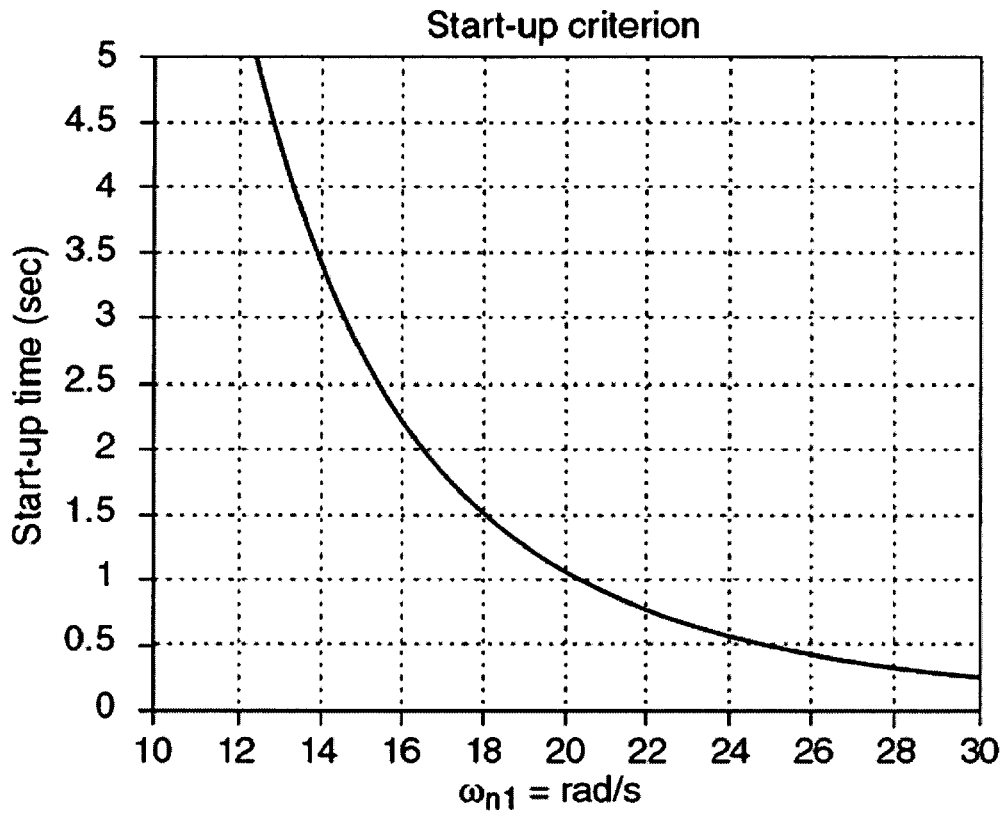
FIG. 14 is a graph illustrating start-up time vs. natural frequency $\omega_{n1}$ of PLL1 of the vortex signal processor of FIG. 12.

In view of this, if the vortex flowmeter 120 comprises, for example, a flow tube 214 having a 2 inch diameter (for mating with conduit portions 116 having a 2 inch diameter), then the maximum vortex shedding frequency is $2\pi 130$ rad/s. FIG. 14 shows the relationship of the start-up time $t_s$ against different values of $\omega_{n1}$ for this example. From FIG. 14, it can be determined that the bandwidth $\omega_{n1}$ of PLL1 1212 may be chosen so that $\omega_{n1} \geq 20$ rad/s, if PLL1 1212 is required to start up within 1 second, as per the present example.

Furthermore, as discussed above with respect to FIG. 9, after heterodyning, the known frequency $\omega_h$ may be subtracted from the frequency estimate of PLL1 1212 and/or PLL2 1214 by, for example, a frequency subtracting module so that only the frequency of interest $\omega_i$ is output as the frequency estimate from PLL1 1212 and/or PLL2 1214 (depending on whether both or only one of the PLLs includes the heterodyning module). Also, the known frequency $\omega_h$ may be subtracted from the frequency estimate of PLL1 1212 and/or PLL2 1214 at some point prior to inputting the signal to the switching mechanism 1216.

Prefilter

Figure 5A:
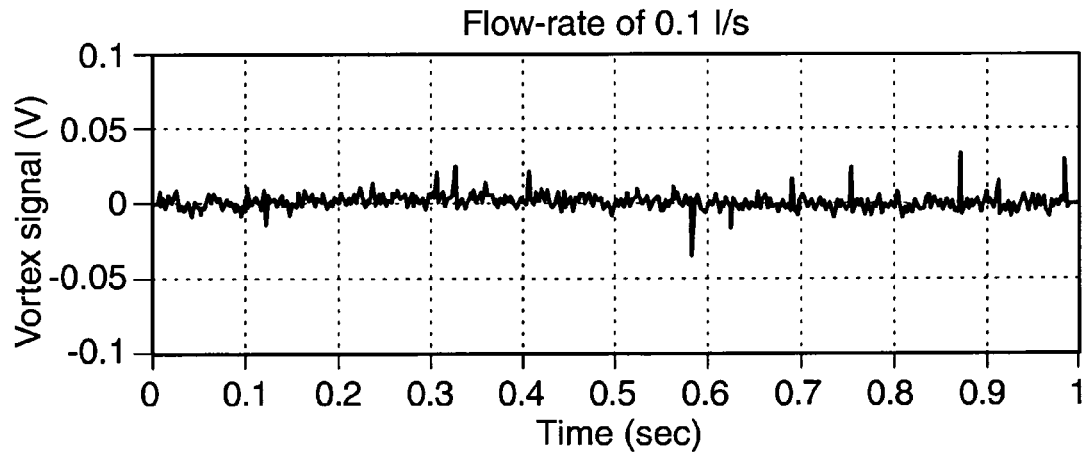
FIGS. 5A and 5B are a set of graphs illustrating a time-series and power spectral estimate of a vortex signal at a flow rate of 0.1 l/s.
Figure 5B:
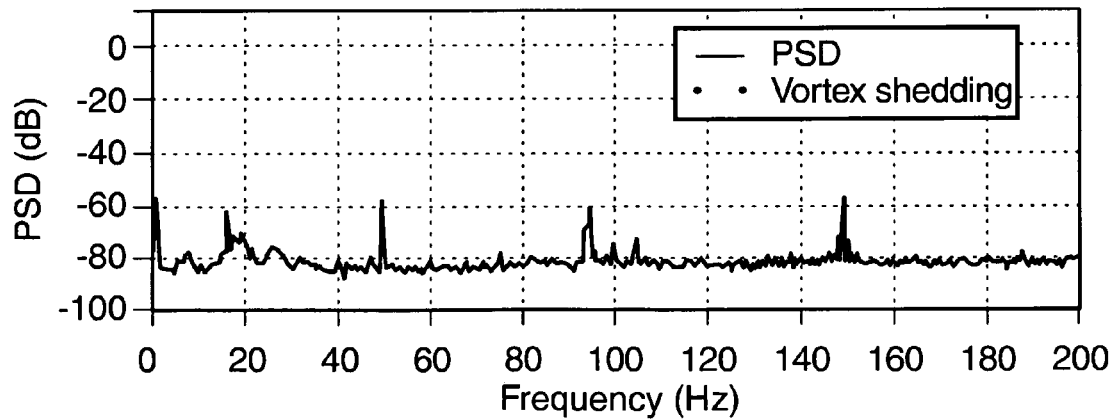

As discussed briefly above, during low flow rates, the amplitude of the vortex shedding signal is small and the noise level becomes significant. In real applications, however, the noise is not simply a white Gaussian noise. There are other frequency harmonics generated by vibrations from, for example, the pump 114 and the conduit portions 116, as shown in FIG. 5. Therefore, at low flow rates, a PLL may give an incorrect measurement by locking on to another frequency instead of the vortex signal.

Figure 15:
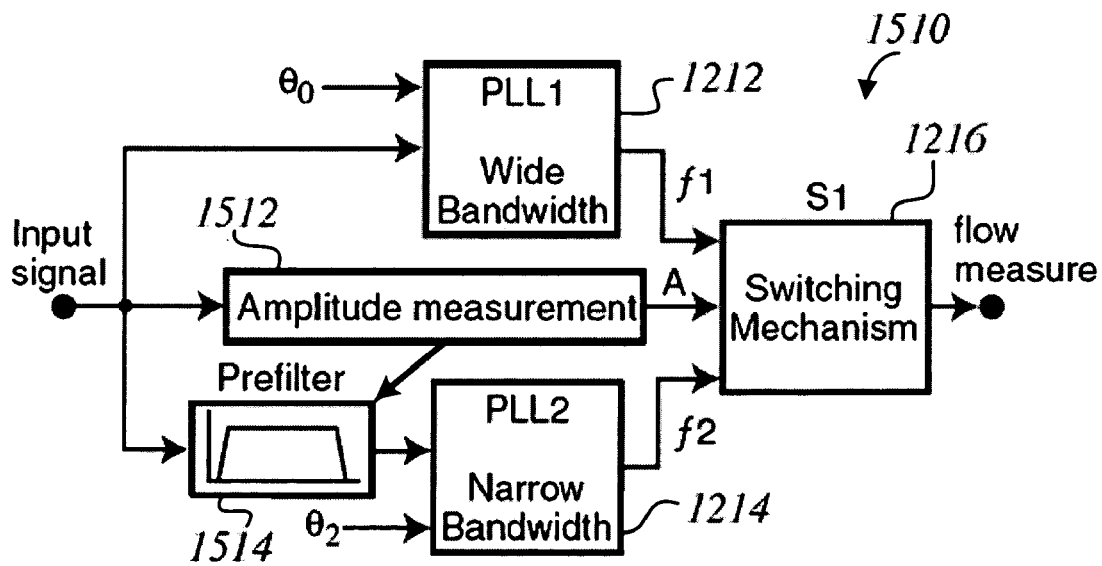
FIG. 15 is a diagram illustrating an implementation of a vortex signal processor using two PLL modules along with a prefilter.

To overcome this problem, a dual PLL 1510 using an amplitude detector 1512 to control a prefilter 1514 may be used, as shown in FIG. 15. The dual PLL 1510 comprises the PLL1 1212, the PLL2 1214, and the switching mechanism 1216 introduced in FIG. 12. The prefilter 1514 may be implemented as a band-pass filter having a high cutoff frequency $f_{ph}$ (Hz) and low cutoff frequency $f_{pl}$ (Hz). The amplitude detector 1512 may switch on the prefilter 1514 if the measured amplitude $\bar{A}$ is below a threshold (user-controllable) amplitude $\bar{A}$, and may switch off the prefilter 1514 if the measured amplitude $\hat{A}$ is above a threshold (user-controllable) amplitude A. When the prefilter 1514 is switched on, the prefilter filters the input signal before the input signal is input to the PLL2 1214. When the prefilter 1514 is switched off, the input signal is input to the PLL2 1214 unfiltered.

The prefilter cutoff frequencies $f_{ph}$ and $f_{pl}$ may be determined using the following steps. First, the Reynolds number Re is used to determine the threshold flow rate $\overline{Q}$. This is the flow rate below which the prefilter 1514 may be switched on. The standard relationship between the Reynolds number and the fluid velocity $Re=VD/\mu$ can be used, where V is the fluid velocity in m/s, D is the diameter of the pipe (e.g., conduit portions 116) in m, and $\mu$ is the fluid dynamic viscosity. Note that $\mu$ is equal to $10^{-6}$ for water. Therefore, the threshold flow-rate in l/s can be expressed in terms of Re, the size of the vortex flowmeter diameter S in inches, and $\mu$ as:

$$\overline{Q} = \frac{25\pi}{4}\mu S Re.$$

Next, the threshold amplitude $\overline{A}$ may be found using the relationship $\overline{A}=\alpha \overline{Q}^2$, where $\alpha$ is a calibration constant (Amplitude-Flow Ratio (AFR)), which is constant for the same vortex flowmeter size (diameter). Next, the high cutoff frequency $f_{ph}$ of the prefilter 1514 may be set to $K\overline{Q}$, where K is the meter factor. The low cutoff frequency $f_{pl}$ may be chosen to be $f_{pl}=0.5f_{min}$, where $f_{min}$ is the minimum frequency of the vortex shedding for the vortex flowmeter 120 in use (refer to Table 1). Note that the low cutoff frequency of the prefilter 1514 may be necessary to filter out any dc offset from any amplifier used by the electronic processor/transmitter module 212 to prepare the vortex shedding signal for measurement by the dual PLL 1510.

The amplitude detector 1512 may be implemented using a peak detector to measure the amplitude $\hat{A}$ of the incoming signal. For this reason, the prefilter is switched on if $\hat{A}<\overline{A}$. However, regarding the peak detector, two design issues may be taken into consideration. First, the threshold amplitude $\overline{A}$ may be made larger than the sensor noise level $s_n$. In most cases, the sensor noise is approximately 5 mV, and therefore $\overline{A}>5$ mV. Second, a relay may be used to detect whether $\hat{A}$ is below $\overline{A}$. A hysteresis of width $h_A$ can be designed so that $h_A=3\sigma_{\hat{A}}^-$, which is equal to the 99.7% confidence interval of the amplitude estimate at the threshold level $\overline{A}$.

Dual PLL 1510 may be implemented such that when the prefilter 1514 is switched on, PLL2 1214 is acting on the data (input signal) without the help of PLL1 1212. This means the center frequency of PLL2 1214 may be switched to a constant center frequency $\theta=2\pi f_{ph}$, where $f_{ph}$ is the high cutoff frequency of the prefilter 1514.

As an example of a design using the above-outlined criteria, a 2 inch vortex flowmeter and a Re=10000 (below which the signal is very noisy) yields a threshold flow rate $\overline{Q}=0.4$ l/s, and $\overline{A}=0.05$V. Accordingly, the high cutoff frequency of the prefilter is $f_{ph}\approx 4$ Hz, and the low cutoff frequency is $f_{pl}\approx 0.5$ Hz.

Switching Mechanism

Turning now to one implementation of the switching mechanism 1216 and its design, the switching mechanism 1216 is the interface that provides the measurements of the dual PLL 1510, such that the center frequency of PLL2 1214 is the frequency estimate from PLL1 1212. The switching mechanism 1216 selects between $\theta_1$ from PLL1 1212 or $\theta_2$ from PLL2 1214 as the flow measurement based on the lock indicator LI2. As discussed above, if the measured amplitude $\hat{A}$ is below a threshold level $\overline{A}$, then the switching mechanism 1216 output is simply $\theta_2$ from PLL2 1214 with a fixed center frequency $\theta=2\pi f_{ph}$, where $f_{ph}$ is the high cutoff frequency of the prefilter 1514. However, if the measured amplitude $\hat{A}$ is greater than $\overline{A}$, then the switching mechanism 1216 outputs the frequency estimate from PLL1 1212 during transient and start-up, and from PLL2 1214 when the flow is constant. The switching mechanism 1216 selects between these modes in response to the lock indicator LI2.

The design of the switching mechanism 1216 may consider the following two issues. First, the natural frequency $\omega_{n1}$ of PLL1 1212 may be selected to be large enough to ensure lock-in of PLL2 1214 despite a noisy center frequency $\theta_1$ (which is the frequency estimate from PLL1 1212). Second, the effect of the noise in $\theta_1$ on the frequency estimate $\theta_2$ may be taken into consideration.

Figure 16:
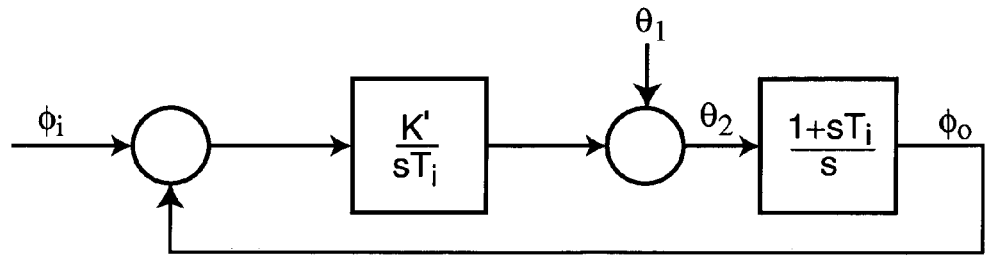
FIG. 16 is a diagram illustrating a system for performing center frequency analysis.

Referring to FIG. 16, the transfer function between the center frequency $\theta_1$ and the phase noise $\phi_o$ is $$H_\phi(s) = \frac{\phi_o}{\theta_1}(s) = \frac{T_i^2 s^2 + T_i s}{T_i s^2 + K' T_i s + K'} = \frac{2/\omega_{n2} s^2 + s}{s^2 + 2\omega_{n2} s + \omega_{n2}^2},$$

where the tuning parameters are $\zeta=1$, $T_t=2/\omega_{n2}$ and $K'=\omega_{n2}$. As shown in FIG. 16 and the equation above, PLL2 1214 acts on the center frequency $\theta_1$ as a high-pass filter with a damping factor $\zeta$ equal to 1, a natural frequency $\omega_{n1}$ equal to $\omega_{n2}$, and a gain $|H_\phi(j\omega)|$ equal to $2/\omega_{n2}$ for large frequencies. Assuming that $\omega_{n2}$ is small so that $|H_\phi(j\omega)|\approx 2/\omega_{n2}$ for all frequencies, the variance of the phase noise due to the center frequency can be written as: where:

$$\text{Var}(\phi_o) = \frac{4}{\omega_{n2}^2}\text{Var}(\theta_1),$$

where:

$$\text{Var}(\theta_1) = \frac{\omega_{n1}^3}{2A_0^2}S_0.$$

Accordingly, the variance of the phase noise in PLL2 1214 due to the frequency estimate of PLL1 1212 is $$\text{Var}(\phi_o) = \frac{2\omega_{n1}^3}{A_0^2 \omega_{n2}^2}S_0,$$

where $\omega_{n1}$ is the bandwidth of PLL1 1212, $\omega_{n2}$ is the bandwidth of PLL2 1214, $A_0$ is the amplitude of the incoming signal and $S_0$ is the spectral height of the noise corrupting the signal. This result demonstrates how the different parameters of the incoming signal $A_0$, $S_0$, and the bandwidth of PLL1 1212 and PLL2 1214, i.e., $\omega_{n1}$ and $\omega_{n2}$, affect the variance of the phase noise $\text{Var}(\phi_o)$ of PLL2 1214, due to a noisy center frequency $\theta_1$ input to PLL2 1214. Assuming that the phase noise $\phi_o$ should not exceed the capture range $(\pi/2)$ of the HTPSD 710 used to implement the PLLs, and using the 99.7% confidence interval $3SD(\phi_o)<\pi/2$, the maximum limit of $\omega_{n1}$ for a given $\omega_{n2}$, $S_0$ and $A_0$ can be found as:

$$\omega_{n1} < \left(\frac{\pi^2 A_0^2 \omega_{n2}^2}{72 S_0}\right)^{1/3}.$$

As can be seen from the above discussion, the maximum limit of $\omega_{n1}$ increases as a result of increasing $\omega_{n2}$. This is due to the transfer function $H_\phi(s)$ acting as a high-pass filter that rejects more noise as $\omega_{n2}$ increases. Further, note that $A_0$ refers to the threshold amplitude $\bar{A}$, because below $\bar{A}$, PLL1 1212 is disabled (i.e., switching mechanism 1216 does not use the frequency estimate of PLL1 1212 as the flow measurement output when $\hat{A}$ is below $\bar{A}$, except in extreme transient situations that cause the measured amplitude $\hat{A}$ to spuriously cross the threshold amplitude $\bar{A}$).

Turning now to the effect of the noise in $\theta_1$ on the frequency estimate $\theta_2$, the transfer function relating $\theta_2$ to $\theta_1$ can be written as:

$$H_\omega(s) = \frac{\theta_2}{\theta_1} = \frac{s^2 T_i}{S^2 T_i + K' T_i s + K'} = \frac{s^2}{s^2 + 2\omega_{n2} s + \omega_{n2}^2}$$

with the same tuning parameters of $\zeta=1$, $T_i=2/\omega_{n2}$ and $K'=\omega_{n2}$. As shown by the transfer function, $H_\omega(s)$ is a high-pass filter with the same damping factor $\zeta$ and natural frequency $\omega_{n1}$ of the filter $H_\phi(s)$ (i.e., 1 and $\omega_{n2}$, respectively). However the gain of the filter $|H_\omega(j\omega)|$ is unity for large frequencies and, assuming small $\omega_{n2}$ is used, the variance of the frequency estimate $\theta_2$ is approximately equal to the variance of the center frequency $\theta_1$ with a variance given by the equation provided above for $\text{Var}(\theta_1)$. The noise in $\theta_2$ resulting from a noisy center frequency $\theta_1$ can be eliminated by fixing $\theta_1$ to a constant value, once lock is acquired by the PLL2 1214. As a result, the only source of noise on $\theta_2$ is the noise in the incoming signal.

Figure 17:
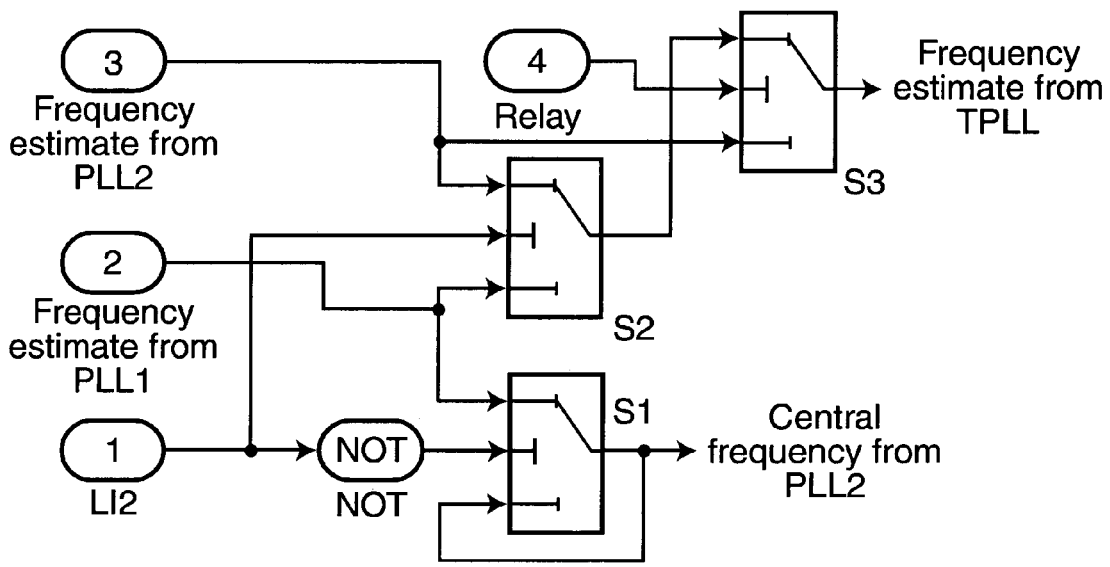
FIG. 17 is a diagram illustrating an implementation of the switching mechanism associated with the vortex signal processor of FIGS. 12 and 15.

FIG. 17 illustrates an implementation of the switching mechanism 1216 introduced in FIGS. 12 and 15. Switches S1, S2 and S3 combine to output the frequency estimate of the dual PLL 1510 as well as the center frequency $\theta$ for PLL2 1214. For example, S1 provides the frequency estimate $\theta_1$ of PLL1 1212 as the center frequency $\theta$ of PLL2 1214 when LI2 is "OFF". When LI2 is "ON," 51 outputs a fixed center frequency $\bar{\theta}$ (i.e., $\theta$ is fixed at its last value). S2 outputs the frequency estimate $\theta_2$ from PLL2 1214 if LI2 is "ON" (constant flow-rate). Otherwise, S2 outputs the frequency estimate $\theta_1$ from PLL1 1212 (e.g., during start-up and large slew-rate transients). S3 takes the output from S2 if the amplitude of the vortex shedding exceeds the threshold value $\bar{A}$. If the measured amplitude $\hat{A}$ is below $\bar{A}$, however, S3 outputs the frequency estimate $\theta_2$ from PLL2 1214, because PLL2 1214 has a fixed center frequency $\theta=2\pi f_{ph}$ and the prefilter 1514 is switched on.

Lock Indicators

Figure 18:
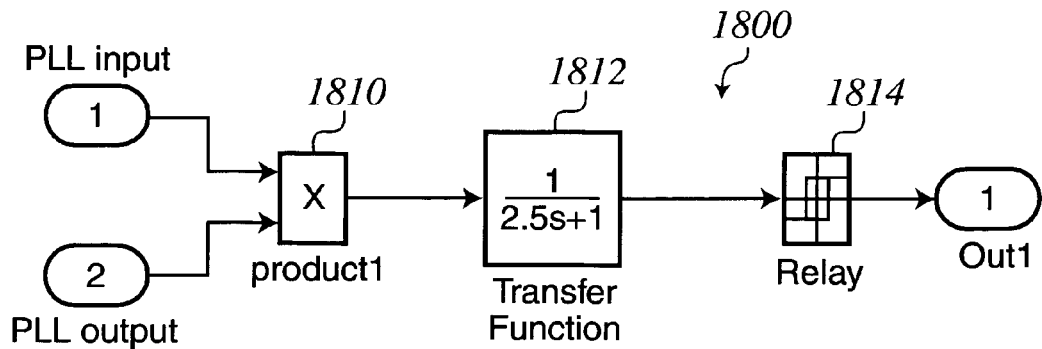
FIG. 18 is a diagram an implementation of the lock indicators LI1 and LI2 of FIG. 12.

FIG. 18 shows an implementation of the lock indicators LI1 and LI2 introduced in FIG. 12. The lock indicators LI2 may be used to ensure reliable operation of the switching mechanism 1216. Further, LI2 may be used to switch on a smoothing filter $1/(1+sT)$ to filter the output of the dual PLL 1510 once LI2 indicates lock. Furthermore, by combining LI1 from PLL1 1212 and LI2 from PLL2, uncertainty measurements can be generated for a self-validating vortex flowmeter implementation, as discussed further below. As shown in FIG. 18, the lock indicator 1800 may include a multiplier 1810, a low-pass filter 1812, and a relay 1814.

The incoming signal ($\text{PLL}_{input}$) may be $s_i(t)=A_0 \sin \phi + n(t)$, where $n(t)$ is assumed to be a white Gaussian noise of zero mean and a spectral height $S_0$. This signal passes through a heterodyning stage giving $s_i^h = A_0/2 \sin \phi_i + n^h(t)$, where $n^h(t)$ has a spectral height of $S_0/2$. The noise output from the PLL can be neglected, and the output ($\text{PLL}_{output}$) is simply $s_o(t)=\sin\phi_o$. Accordingly, the output of the multiplier 1810 is:

$$s_i^h(t) s_o(t) = l(t) = \frac{A_0}{4}(\cos(\phi_i - \phi_o) - \cos(\phi_i + \phi_o)) + n'(t),$$

where the spectral height of the noise $n'(t)$ is $S_0/4$.

The signal $l(t)$ is passed through a simple first-order filter, so that the output of the filter is:

$$l_f(t) \approx \frac{A_0}{4} - \frac{A_0|G(j\omega)|}{4}\cos 2\phi_i + n_f(t),$$

where $|G(j\omega)|$ is the gain of the filter and is expressed as:

$$|G(j\omega)| = \frac{1}{(1+\omega^2 T_L^2)^{1/2}}.$$

Accordingly, when the PLL is in lock, then $\phi_i \approx \phi_o$ and the output of the filter has an average of $A_0/4$. Heterodyning in this case has the advantage of reducing the second harmonic in $l(t)$, as the frequency of the input signal is taken further by the heterodyning frequency $\omega_h$ in the magnitude response $|G(j\omega)|$.

When the PLL is out of lock, however, the filter output is:

$$l_f(t) = \frac{A_0}{4}|G(j\omega)|(\cos(\phi_i - \phi_o) - \cos(\phi_i + \phi_o)) + n_f(t),$$

with a zero mean. Accordingly, the relay threshold $L^*$ may be chosen such that the relay output is 1 if $l_f > L^*$, and otherwise is 0.

Figure 19A:
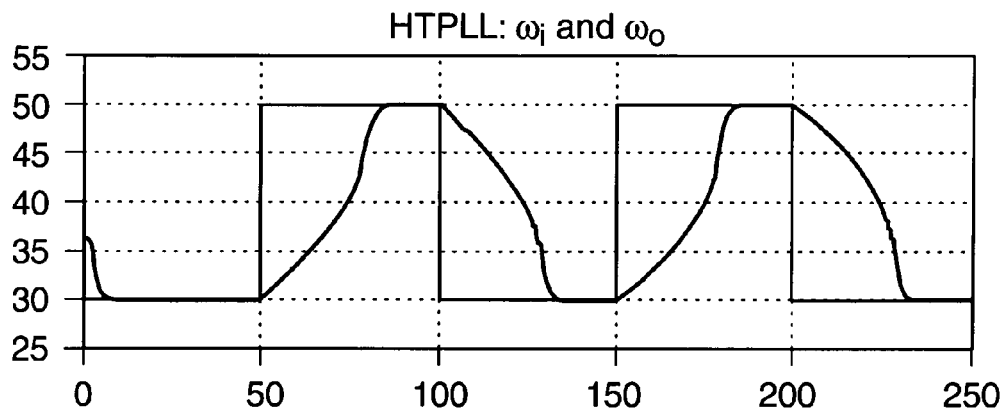
FIGS. 19A and 19B are graphs illustrating the output of the lock indicator of a PLL.
Figure 19B:
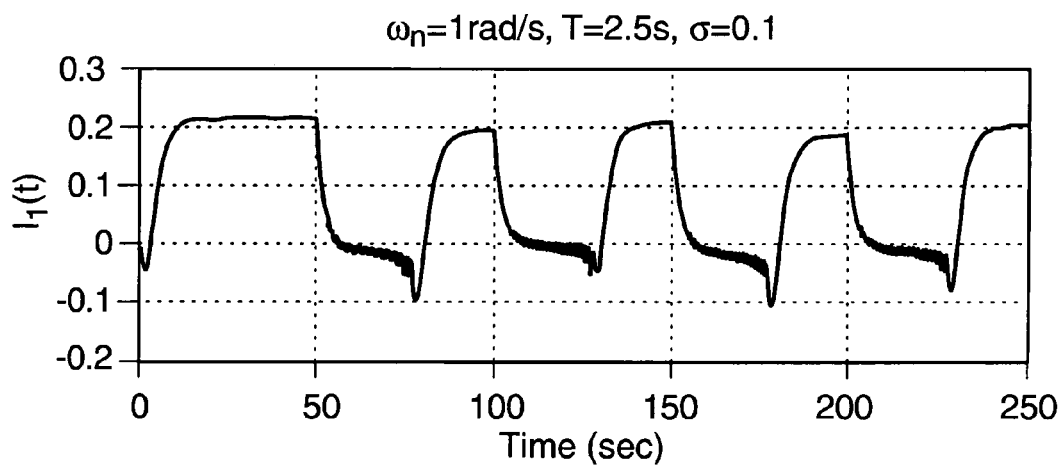

In this lock indicator design, the threshold $L^*$ of the relay may be chosen to be $A_{0,min}/4$, where $A_{0,min}$ is the amplitude of the vortex shedding at the minimum flow-rate. FIG. 19 illustrates a simulation of the lock indicator of a PLL with $\omega_n=1$. The amplitude of the sine wave signal is $A_0=1$, and the noise added to the signal has a spectral height of 1e-4 and a bandwidth of 100 Hz. The frequency of the incoming signal is varied as a step change between 30 rad/s to 50 rad/s. FIG. 19 shows that $L^*$ and the filter time constant $T_L$ should be chosen carefully.

It is sufficient to use a low noise analysis, as prefilter 1514 is used to filter out the noise in low flow rates, and hence high SNR is input to PLL2 1214. Accordingly, when the PLL is out-of-lock, the noise $n_f(t)$ is very small compared to $A_0|G(j\Delta\omega)|/4$, and the second harmonic signal is reduced significantly by the low-pass filter 1812 due to the heterodyning, so both noise elements can be neglected when the PLL is out-of-lock.

When out-of-lock, the amplitude of the filtered signal $l_f(t)$ always should be smaller than the threshold of the relay 1814, so that $A_0|G(j\omega)|/4<L^*$, which can be simplified to $$1+\omega^2 T_L^2 > \left(\frac{A_0}{4L^*}\right)^2.$$

As shown in FIG. 19, the second harmonic has a maximum amplitude around the lock-in frequency, where $\Delta\omega_L \approx 2\omega_n$. As such, the filter time constant $T_L$ can be expressed as:

$$T_L > \frac{1}{2\omega_n}\sqrt{\left(\frac{A_0}{4L^*}\right)^2 - 1}.$$

If the threshold level is small and $A_0/4L^* \gg 1$, this can be simplified to:

$$T_L > \frac{1}{2\omega_n}\left(\frac{A_0}{4L^*}\right),$$

which shows that as $L^* \to 0$, $T_L \to \infty$ and a large time constant is needed. Therefore, this lock indicator depends on the amplitude of the incoming signal, and it may use a filter 1812 with large time constant to keep the noise level, when out-of-lock, below a small threshold value $L^*$. This is likely the case in the vortex filter application, as the amplitude of the signal is very small in low flow rates.

Figure 20:
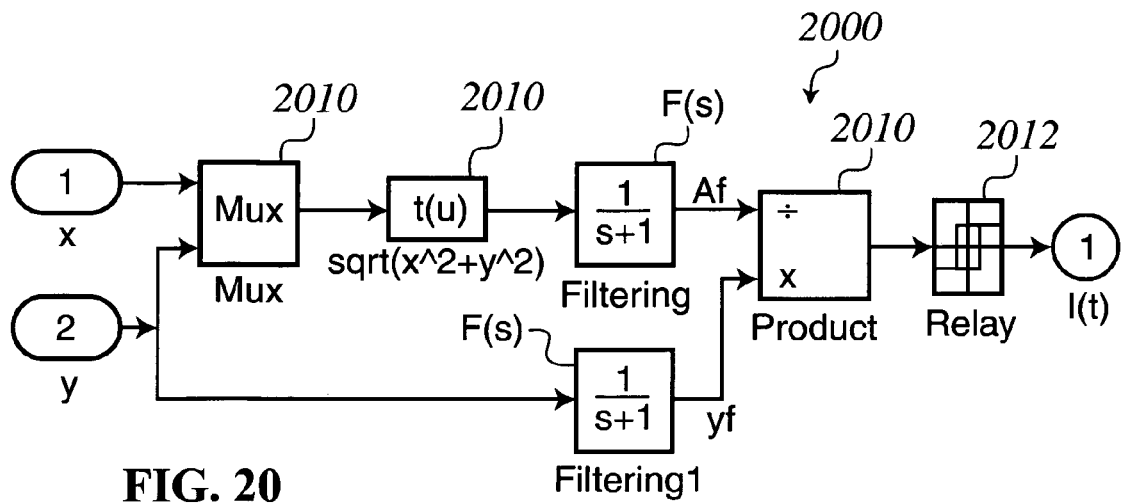
FIG. 20 is a block diagram illustrating an implementation of a lock indicator based on internal signals of Hilbert Transformer Phase-Sensitive Detector.

Another implementation of the lock indicators LI1 and LI2 is shown in FIG. 20. In FIG. 20, lock indicator 2000 includes trigonometric functions 2010, filters F(s), and relay 2012. Instead of inputting the input and output of the PLL to the lock indicator 1800 as described above, the internal signals of the HTPSD 710 can be used to indicate lock/out-of-lock of the PLLs 1212 and 1214. Referring to FIG. 20, the signals $x=A_0 \sin(\phi_t-\phi_0)$ and $y=A_0 \cos(\phi_t-\phi_0)$ are used as follows: the amplitude estimate $\hat{A}$ can be found using $\sqrt{x^2+y^2}$ and filtered using a simple low-pass filter $F(s)=1/(1+sT_L)$ to obtain $\hat{A}_F$. Likewise, the signal y is filtered using the filter F(s) to give $y_F$. The ratio $l(t)=y_F/\hat{A}_F$ can be used to indicate lock $l(t) \to 1$, or out-of-lock $l(t) \to 0$. The lock-indicator design for high SNR is acceptable for this application because the prefilter 1514 is used to improve the signal:noise input to the dual PLL 1510 in low flow-rates.

Figure 21A:
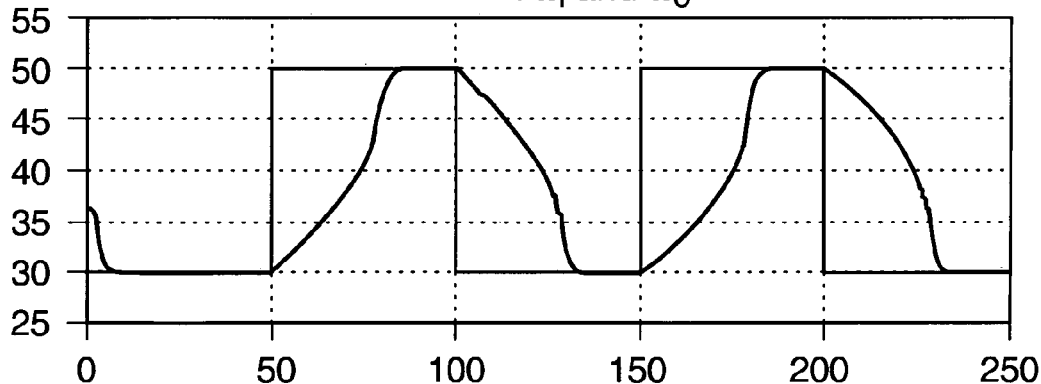
FIGS. 21A and 21B are graphs illustrating the output of the lock indicator of FIG. 20.
Figure 21B:
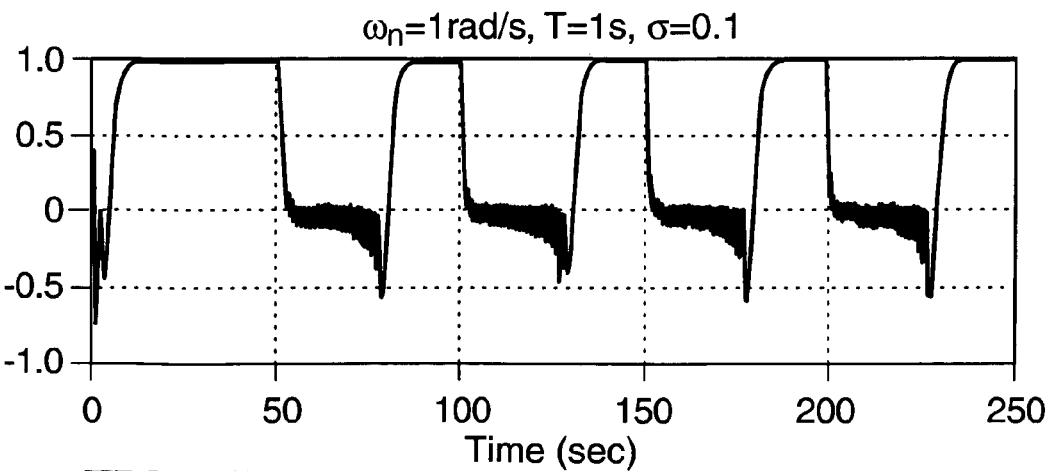

FIG. 21 shows the ratio $l_f(t)=y_F/\hat{A}_F$ of a PLL with $\omega_n=1$ in a response to a step change in frequency of the incoming signal varying between 30 rad/s to 50 rad/s. The sine wave signal has an amplitude $A_0=1$ and an additive noise with $\sigma_n=0.1$.

FIG. 21 shows that reliable lock detection can be achieved by using a relay 2012 with a threshold value around 0.5 (half way between 0 and 1), so that the relay outputs "1" (i.e., locked) if $l_f(t)$ exceeds 0.5, and the relay outputs "0" (i.e., out-of-lock) if $l_f(t)$ is below 0.5. Moreover, the worst case (most noisy) of the signal $l_f(t)$ occurs when the PLL is out-of-lock and the PLL frequency estimate reaches the lock-in range, which is approximately equal to $\Delta\omega_L \approx 2\omega_n$. Therefore, the filter time constant T can be designed by considering the following: the signal $y=\cos \Delta\phi$ is filtered, and the output of this filter should be kept smaller than the threshold level (0.5) of the relay 2012. As shown in FIG. 21, $l_f(t)$ has its maximum at around the lock-in range $\Delta\omega_L$. Hence:

$$\sqrt{1+\Delta\omega^2 T_L^2} > 2 \to T_L > \frac{0.866}{\omega_n} \approx \frac{1}{\omega_n},$$

where $\zeta=1$.

An advantage of the lock indicator 2000, assuming high SNR, is that the threshold level $L^*$ is always 0.5 regardless of the amplitude of the incoming signal. Moreover, the lock indicator 2000 uses the HTPSD 710 with no second harmonic (i.e., less noise).

As described above, the lock indicator LI2 of PLL2 1214 may indicate out-of-lock during transients and start-up, so that the output of the dual PLL 1510 is simply the frequency estimate of PLL1 1212, and the dual PLL 1510 may output the frequency estimate of PLL2 1214 once the flow rate is constant and PLL2 1214 has acquired lock.

Figure 22A:
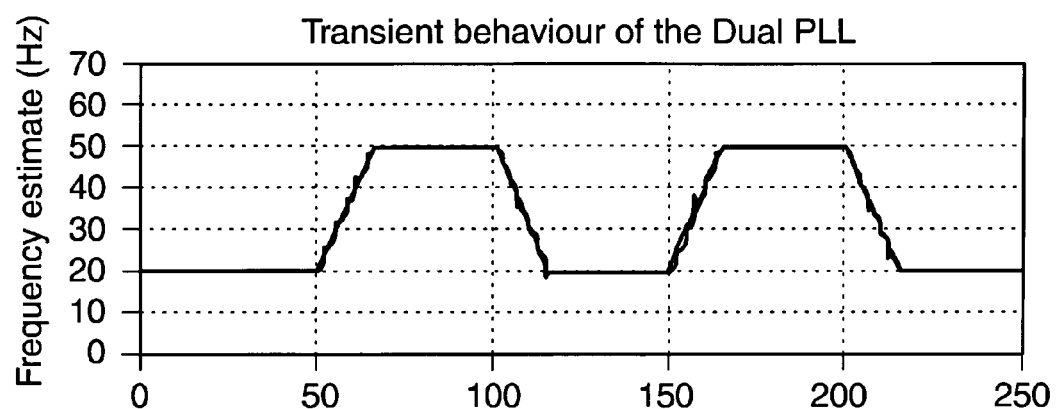
FIGS. 22A and 22B are graphs illustrating the transient behavior of the lock indicator LI2 of the dual PLL shown in FIG. 15.
Figure 22B:
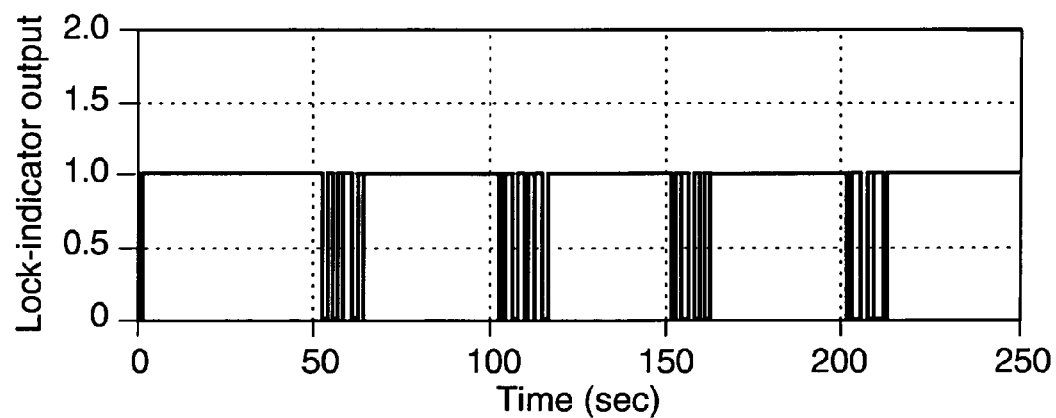

The center frequency of PLL2 1214 may be the frequency estimate of PLL1 1212, which is likely always locked in high flow-rates. So if the flow-rate is changing (e.g., as a ramp change), the lock indicator LI2 may be switching on/off during transients, as shown in FIG. 22. In FIG. 22, a sine wave signal is input to the PLL with its frequency varying between 20 Hz and 50 Hz as a ramp change (rate of change of 3 1/s²). The STD of the noise added to the sine wave signal is $\sigma=0.1$. As shown in FIG. 22, during transients the frequency estimate of the dual PLL 1510 switches between the output of PLL1 1212 and the output of PLL2 1214, because the lock indicator LI2 of PLL2 is also switching on and off during transients. The reason for this is that the center frequency of PLL2 1214 is provided by PLL1 1212, which helps bring PLL2 1214 into lock, but PLL2 1214 soon goes out-of-lock as the flow rate is still changing (for large slew-rates).

Figure 23:
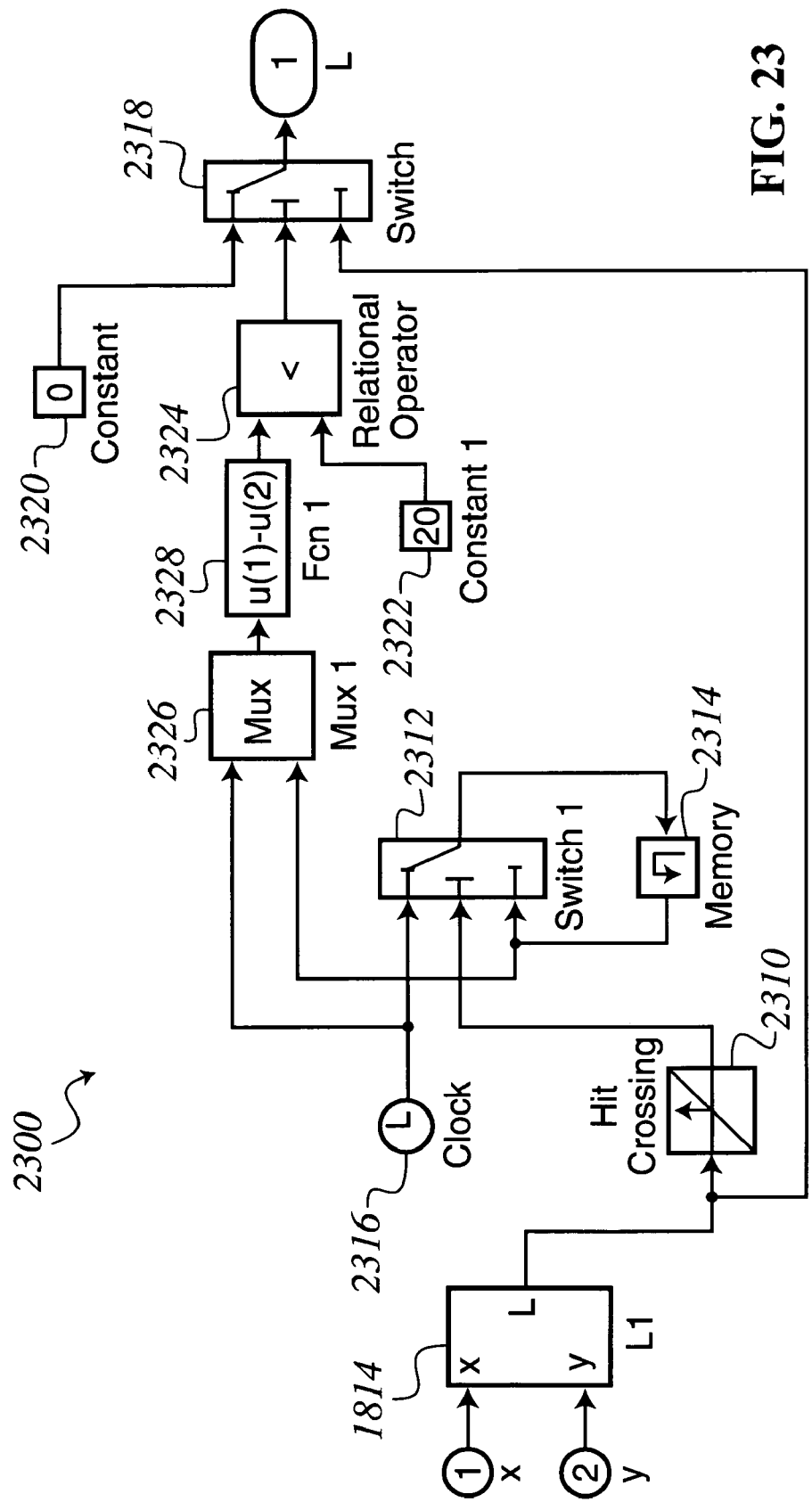
FIG. 23 is a block diagram illustrating another implementation of a lock indicator LI2.

Accordingly, a further implementation of the lock indicator (LI2) may follow the design of being slow and sure to indicate lock but fast in deciding that the PLL2 1214 is out of lock. Referring to FIG. 23, this design may be implemented by adding components to the lock indicator 2300. As shown, the output of LI2 (the output of the relay 1814) passes through a hit crossing 2310. The hit crossing 2310 signals that LI2 is out of lock when the output of the relay changes from an ON state (i.e., 1) to an OFF state (i.e., 0). Once the hit crossing 2310 indicates that LI2 is out of lock, a switch 2312 saves in a memory 2314 the time $t_1$ when the hit crossing 2310 is ON, which is provided by the clock 2316. A switch 2318 works to keep the output of LI2 zero (by outputting, for example, a "0" signal controlled by a constant module 2320) for a time $t_d$, which is a design parameter controlled by a time period module 2322. Once a relational block 2324 determines that the time difference (determined by, for example, a multiplexer 2326 and a function block 2328) between the clock output $t_c$ and $t_1$ is greater than the specified value $t_d$, the output of LI2 may be simply the output of the relay 1814.

Adding the new components shown in FIG. 23 provides a structure that keeps the output of the lock indicator LI2 zero for a time $t_d$, once PLL2 1214 is out of lock.

Accordingly, the dual PLL 1510 can simply output the frequency estimate of PLL1 1212 as the flow measurement output of the dual PLL 1510 during transients, until the time difference $t_c-t_1>t_d$, after which the output of the dual PLL

Figure 24A:
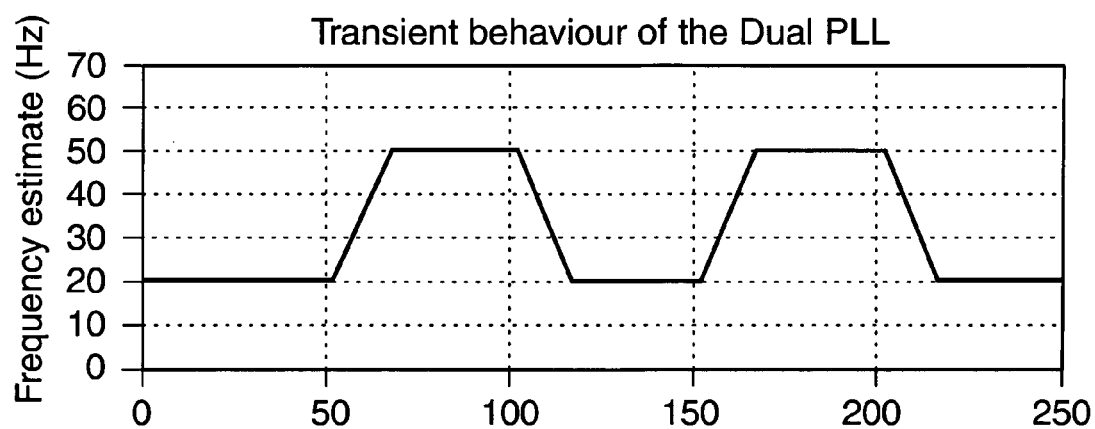
FIGS. 24A and 24B are graphs illustrating the transient behavior of the lock indicator LI2 shown in FIG. 23.
Figure 24B:
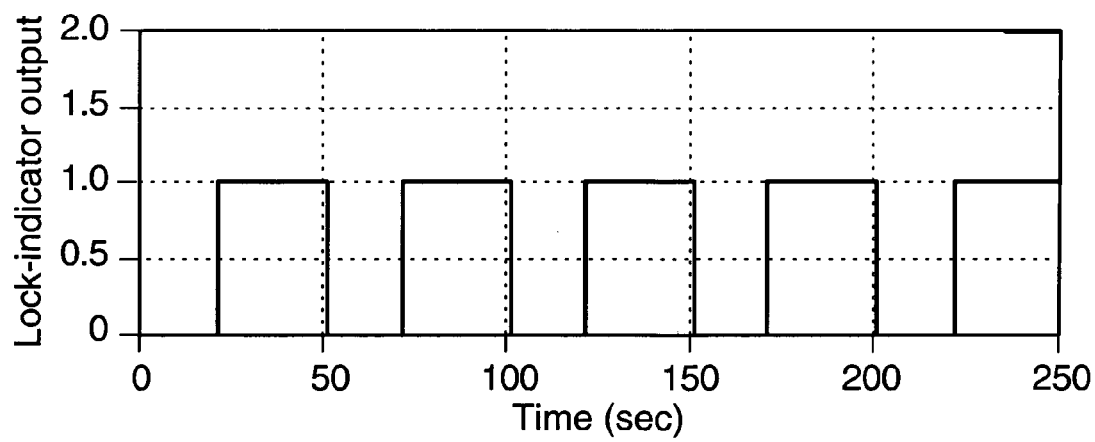

1510 is the frequency estimate of PLL2 1214. The performance of the dual PLL processor is shown in FIG. 24, after adding the modified implementation of the lock indicator shown in FIG. 23. Note that the lock indicator output is OFF during transient, and not repeatedly switching between on/off as in FIG. 22.

If the slew-rate (slope) of the flow change is not large enough to cause PLL2 1214 to lose lock, then LI2 would remain ON, and the dual PLL 1510 takes the measurements from PLL2 1214. If the slew-rate of the flow change, however, is large (maximum slew-rate is $\pi \omega_{n2}^2/2$), then the dual PLL 1510 outputs the frequency estimate of PLL1 1212 for a time $t_d$ until it switches to the frequency estimate of PLL2 1214. For example, $t_d$ can be chosen to be $t_d \leq 5$, which is an arbitrary choice. This choice means if the flow rate changes and PLL2 1214 loses lock, then the actual output of LI2 will be taken after $t_d$ seconds. If $t_d$ is smaller than the transient time (and PLL2 is out-of-lock), however, then dual PLL 1510 will be switching between the outputs of PLL1 1212 and PLL2 1214 during the transient, but less often than shown in FIG. 22.

Comparison of Single PLL and Multiple PLL Performances

Figure 25A:
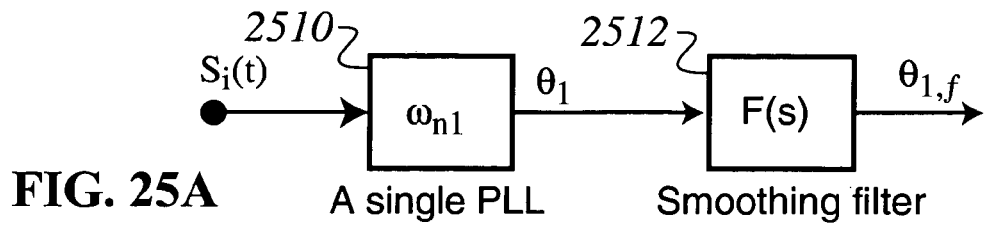
FIG. 25 is a block diagram for comparing a single PLL followed by a smoothing filter, and a dual PLL structure.
Figure 25B:
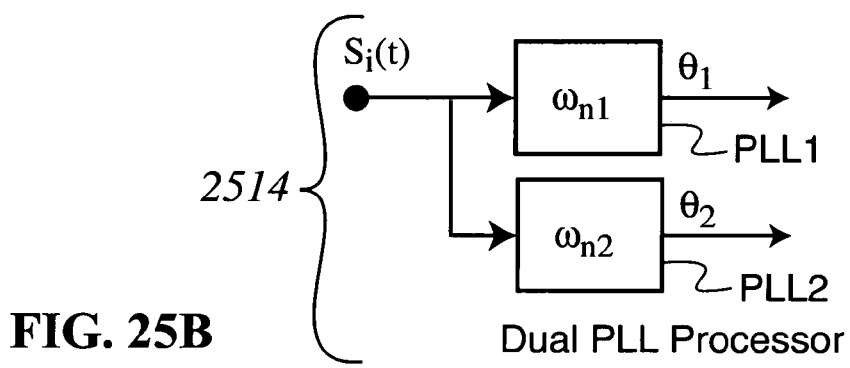

Referring to FIG. 25, the following analysis compares two PLL structures. One structure uses a single PLL 2510 with a bandwidth $\omega_{n1}$ followed by a first order filter 2512 with a time constant T to smooth out the frequency estimate from the PLL 2510, and the other is a dual PLL 2514 structure with $\omega_{n1}$ being the bandwidth of a fast PLL (PLL1) and $\omega_{n2}$ being the bandwidth of a slow PLL (PLL2). The purpose of the comparison is to demonstrate that, with proper tuning of the dual PLL processor, the dual PLL 2514 can achieve superior performance over the single PLL 2510 followed by the smoothing filter 2512.

The transfer function between the noise n' and the frequency estimate $\theta_1$, from the single PLL 2510 is:

$$\frac{\theta_1}{n'}(s) = \frac{Ks/T_i}{s^2 + Ks + K/T_i},$$

where $K=2\omega_n$, $T_i=2/\omega_n$, $\zeta=1$ and n' is a Gaussian noise of zero mean and a spectral height equal to $S_0/A_0^2$, where $A_0$ is the amplitude of the incoming sinewave signal. Now, taking the smoothing filter 2512 into consideration, the transfer function between n' and the smoothed frequency estimate $\theta_{1,f}$ is:

$$H_{\theta_{1,f}}(s) = \frac{\theta_{1,f}}{n'}(s) = \frac{a\omega_{n1}^2 s}{(s+a)(s^2 + 2\omega_{n1}s + \omega_{n1}^2)},$$

$$= \frac{a\omega_{n1}^2 s}{s^3 + (a + 2\omega_{n1})s^2 + (2a\omega_{n1} + \omega_{n1}^2)s + a\omega_{n1}^2},$$

where $\alpha=1/T$.

The variance of the frequency estimate $\theta_{1,f}$ is given by:

$$\text{Var}(\theta_{1,f}) = \frac{1}{2\pi}\int_{-\infty}^{\infty}|H_{\theta_{1,f}}|^2 \frac{S_0}{A_0^2}d\omega,$$

which may be simplified to yield the following expression for the variance of the smoothed frequency estimate:

$$\text{Var}(\theta_{1,f}) = \frac{\omega_{n1}^3 a^2}{4(A_0^2(\omega_{n1}+a))^2}S_0.$$

This expression can be used to explore the effect of the smoothing filter 2512 on the frequency estimate of the single PLL 2510:

(1) If $a = \infty$ (i.e., $T = 0$ and no filtering is used), then $$\text{Var}(\theta_{1,f}) \to \frac{\omega_{n1}^3}{4A_0^2}S_0 = \text{Var}(\theta_1) \propto \omega_{n1}^3.$$

(2) If a large time constant T is used, and $a << \omega_{n1}$, then $$\text{Var}(\theta_{1,f}) \to \frac{\omega_{n1}}{4A_0^2 T^2}S_0 \propto \omega_{n1}/T^2.$$

(3) If $a = \omega_{n1}$, then $$\text{Var}(\theta_{1,f}) \to \frac{\omega_{n1}^3}{16A_0^2}S_0 = \frac{\text{Var}(\theta_1)}{4},$$

and a reduction by a factor of 4 is obtained, compared to the "no filtering" case above.

Assuming that the accuracy (of the software process or hardware) of the dual PLL 2514 is equal to the accuracy (of the software process or hardware) of the single PLL 2510 followed by the smoothing filter 2512, such that $\text{Var}(\theta_2) = \text{Var}(\theta_{1,f})$, then:

$$\omega_{n2} = \omega_{n1}^3 \left(\frac{1/T^2}{(\omega_{n1} + 1/T)^2}\right)^{1/3}.$$

Figure 26:
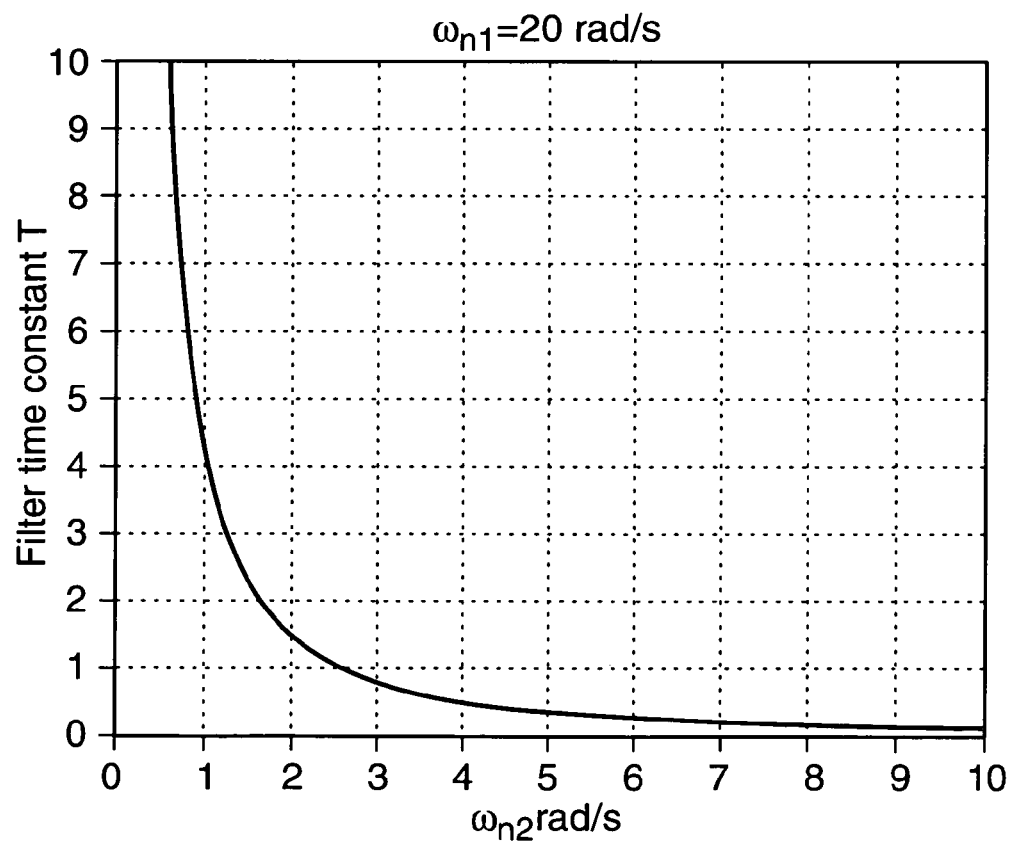
FIG. 26 is a graph comparing the performance of the single PLL followed by a smoothing filter, and a dual PLL structure, shown in FIG. 25.

For example, for a 2 inch diameter vortex flowmeter, $\omega_{n1}$ (of, e.g., PLL1 or single PLL 2510) may be greater than or equal to 20 rad/s to achieve a start-up within 1 second, as discussed above with respect to FIG. 14. FIG. 26 shows the relationship between $\omega_{n2}$ and the required time constant T of the smoothing filter 2512 so that $\text{Var}(\theta_2)=\text{Var}(\theta_{1,f})$, for a given $\omega_{n1}=20$ rad/s. FIG. 26 further indicates that for single PLL 2510 (which can also apply to PLL1 in the dual PLL 2514) having a bandwidth $\omega_{n1}=20$ rad/s, a smoothing filter 2512 with a time constant of approximately T=1.5 seconds may be required to smooth out $\theta_1$ to get the same variance of the frequency estimate obtained using the dual PLL 2514 with $\omega_{n2}=2$ rad/s. Note that a larger $\omega_{n1}$ would require a larger time constant T to smooth out the data and keep the variance of the frequency estimate equal to that obtained using the dual PLL 2514 with $\omega_{n2}=2$. Having a smaller $\omega_{n1}$ (e.g., 15 rad/s), however, would require a smaller time constant T, but this degrades the start-up performance, as shown in FIG. 14.

Considering the transient performance of the single PLL 2510 followed by the smoothing filter 2512, assume that a frequency ramp with a slope $\alpha_f$ is input to both the single PLL 2510 structure and the dual PLL 2514 structure. For the single PLL 2510 structure, the total error is the combined error due to the single PLL 2510 and the smoothing filter 2512. The single PLL 2510 is shown to have an error equal to $2\alpha_f/\omega_{n1}$ and the error resulting from a first order filter $F(s)=1/(1+sT)$ due to a ramp input is equal to:

$$\lim_{s \to 0} sE(S) = \lim_{s \to 0} \frac{\alpha_f}{s} \frac{sT}{1+sT} = \alpha_f T.$$

Therefore, the total error of the single PLL 2510 structure following a ramp frequency is:

$$e_{ss1} = \frac{2\alpha_f}{\omega_{n1}} + \alpha_f T.$$

The dual PLL 2514 structure, however, has an error equal to $2\alpha_f/\omega_{n1}$, provided a proper design of LI2 is achieved (i.e., a small filtering time constant is used in LI2). Therefore, the transient performance of the single PLL 2510 followed by the smoothing filter 2512 has an additional error during transient equal to $\alpha_f T$. Thus, for the same accuracy performance of both the single PLL 2510 (plus the smoothing filter 2512) and the dual PLL 2514, the dual PLL 2514 gives better start-up and transient performance than the single PLL 2510 (with smoothing filter 2512), particularly with a large slew-rate $\alpha_f$.

A Process for Designing the Multiple PLL

Figure 27:
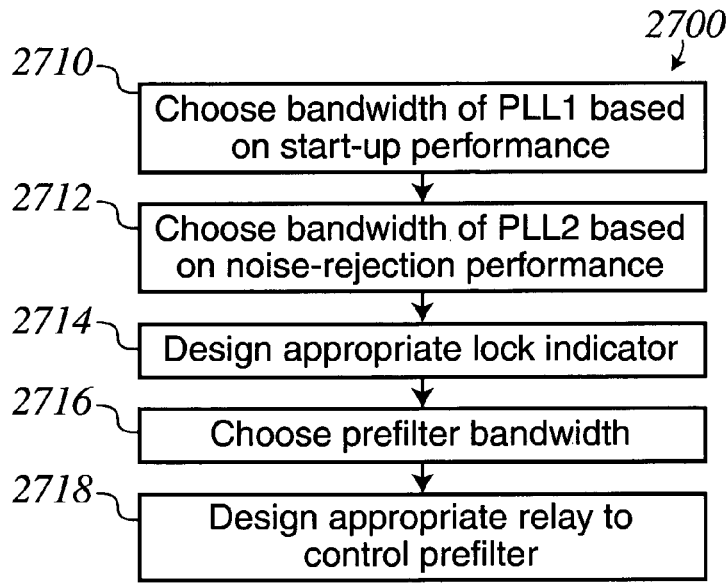
FIG. 27 is a flow chart illustrating a process for implementing the dual PLL shown in FIG. 15.

FIG. 27 illustrates one implementation of a process 2700 for designing, for example, the dual PLL 1510 (shown in FIG. 15). First, an appropriate bandwidth for the PLL1 1212 (i.e., the "faster" PLL) may be chosen (step 2710). As discussed above, the PLL1 1212 may be designed to lock into the vortex frequency quickly, (e.g., within 1 second). Accordingly, the natural frequency $\omega_{n1}$ may be chosen according to:

$$\omega_{n1} \geq \left(\frac{3\omega_{max}^2}{16\pi^2 T}\right)^{1/3},$$

where $\omega^2_{max}$ is the maximum frequency of the vortex shedding signal.

Next, the appropriate bandwidth for the PLL2 1214 (i.e., the "slower" PLL) may be chosen (step 2712). As discussed above, the PLL2 1214 may be designed to lock into the vortex frequency with better noise-rejection performance than conventional vortex flowmeters. This can be achieved, for example, by selecting $\omega_{n2}$ such that $\omega_{n2} \leq 0.15\omega_{min}$, where $\omega_{min}$ is the minimum frequency of the vortex shedding signal (which is, from Table 1, approximately 2 Hz for a 2 inch size flowmeter).

Next, the lock indicator LI2 may be designed so that, for example, the output of the dual PLL 1510 may be simply the output of PLL1 1212 during start-up, and transients with large slew-rate (step 2714). Once PLL2 1214 acquires lock, the output of the dual PLL 1510 may be simply the output of PLL2 1214 when the flow rate is constant or during flow variations with small slew-rates. The lock indicator based on the internal signals of the HTPSD 710 (as discussed with respect to FIG. 20) may be used, and the time constant of the filter may be based on $T > 1/\omega_{n2}$.

Next, the bandwidth of the prefilter 1514 may be designed so that it filters out the frequency harmonics generated by the impeller pump 114 and other interference at low flow rates (step 2716). In most cases, these harmonics have high frequencies and may be outside the bandwidth of the prefilter 1514. The choice of the high frequency cut-off $f_{ph}$ (Hz) may be based on:

$$f_{ph} = K\frac{25\pi}{4}\mu SRe,$$

where K is the meter K-factor, $\mu$ is the dynamic viscosity, S is the size of the vortex flowmeter (diameter) in inches and Re is the Reynolds number below which the prefilter 1514 is switched on. The low cut-off frequency of the prefilter 1514, however, may be simply $f_{pl} \approx 0.5\, f_{min}$, where $f_{min}$ is the minimum frequency of the vortex shedding signal in Hz.

Finally, the relay (e.g., amplitude detector 1512) that switches on the prefilter 1514 may have a hysteresis having a width $h_r$ to take account of the amplitude noise (step 2718). The hysteresis width may be chosen such that $h_r = 3\sigma_A^-$, that is the 99.7% confidence interval of the amplitude noise at the threshold level A, which can be estimated during calibration.

Figure 28A:
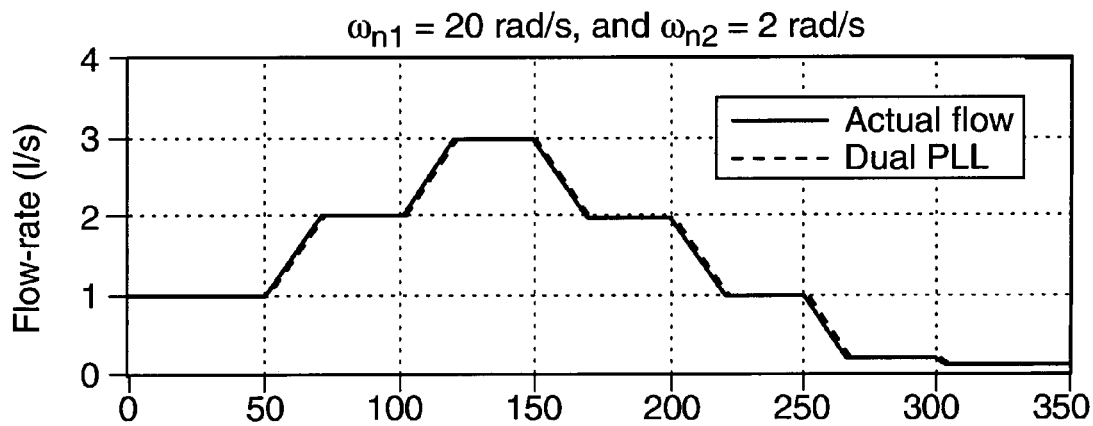
FIGS. 28A and 28B are graphs illustrating outputs from the dual PLL processor shown in FIG. 15.
Figure 28B:
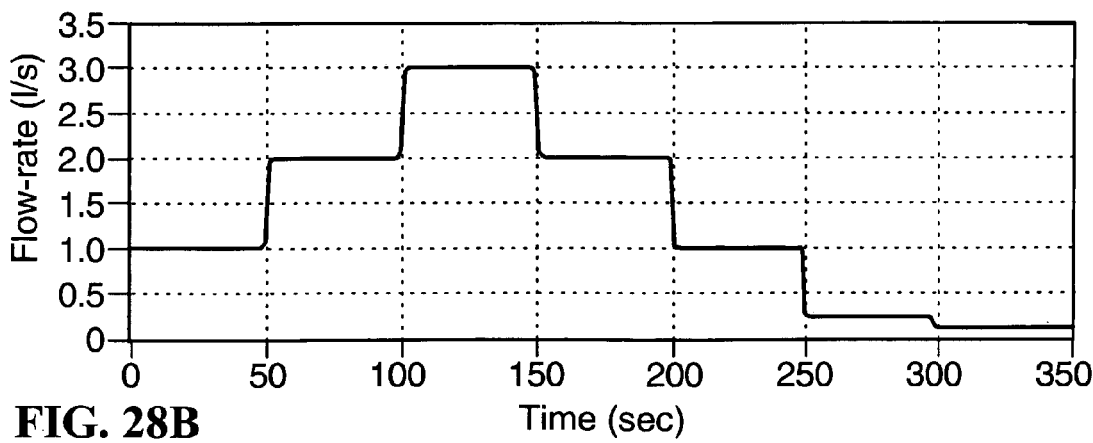

Outputs from a dual PLL processor implemented according to the above discussions are shown in upper and lower traces of FIG. 28. As shown in the upper trace of FIG. 28, the output of the dual PLL is the flow-estimate from PLL1 during start-up, and the output of the dual PLL switches to PLL2, once locked, and remains locked during transients with small slew-rate. As shown in the lower trace of FIG. 28, in transients with larger slew-rates, the output of the dual PLL is from PLL1 until PLL2 acquires lock, and then the output of the dual PLL is simply taken from PLL2.

A Process for Measuring Flow Rates Using the Vortex Flowmeter

Figure 29:
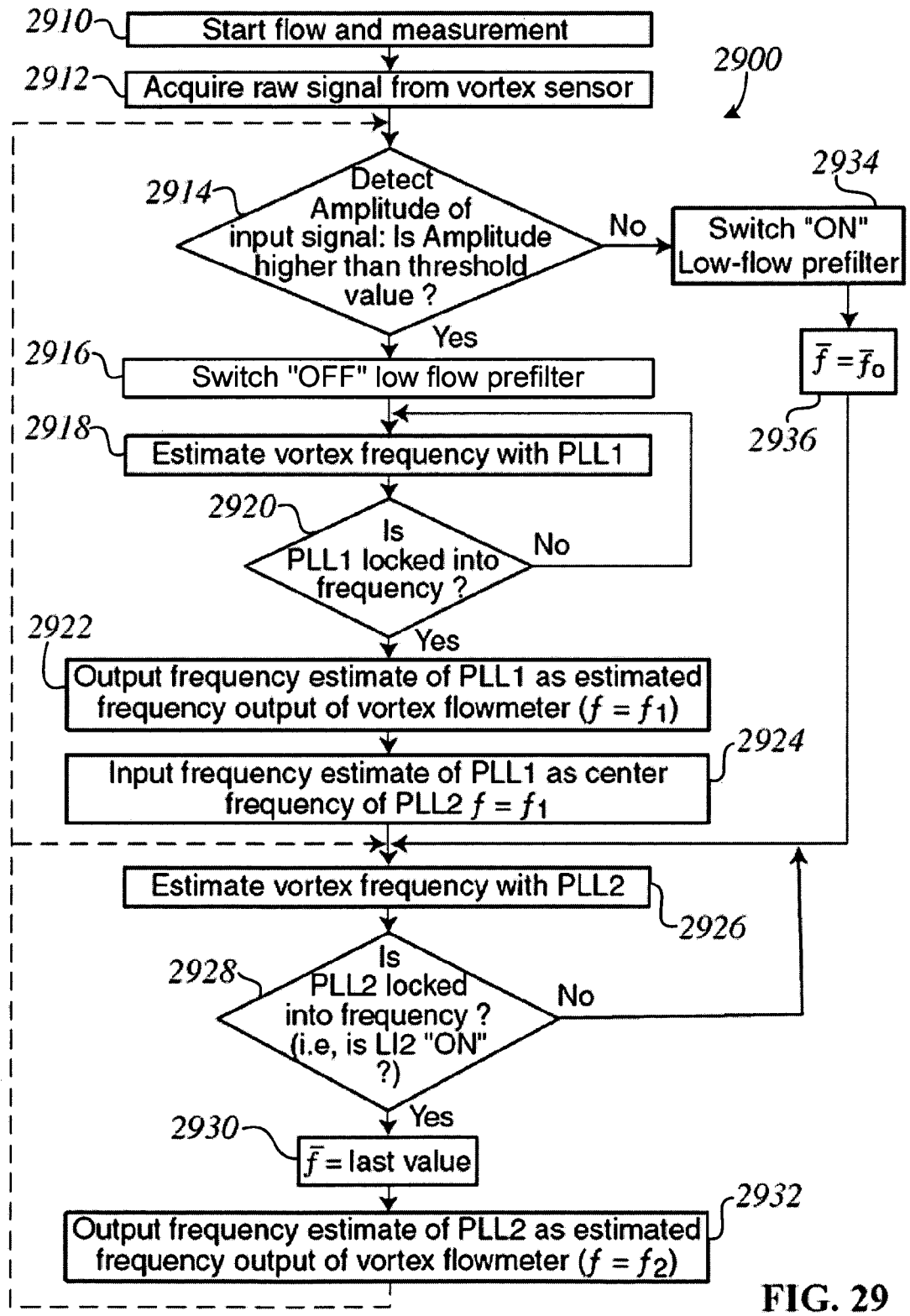
FIG. 29 is a flow chart illustrating a process for measuring flow of a material with a vortex flowmeter having the dual PLL structure shown in FIG. 15.

Referring to FIG. 29, an exemplary flow rate measurement procedure 2900 implemented by the vortex flowmeter 120 may be used to measure the flow rate of material through the conduit portions 116. In general, the procedure may be performed continuously to provide real-time data to the central controller 124 of the process control system 110 shown in FIG. 1.

During start-up of the process control system 110, material flow may be induced in the conduit portions 116 by the pump 114 (step 2910). At this time, the sensor portion 210 of the vortex flowmeter 120 may begin to sense the flow of the material (i.e., sense vortices being shed in the wake of the bluff body 216 as the material passes) and to send electrical signals to the electronic processor/transmitter portion 212, where measurement of the vortex shedding frequency will commence (step 2912). Before or after the raw vortex shedding signal reaches the electronic processor/transmitter portion 212, it may be amplified to facilitate processing. Further, the raw vortex shedding signal may be converted to a digital signal by an analog-to-digital converter (ADC) before or after it reaches the electronic processor/transmitter portion 212. In any case, the vortex shedding signal may be input to the electronic processor/transmitter portion 212 for further processing.

Once the electronic processor/transmitter portion 212 receives the electrical signal (vortex shedding signal) as an input, the amplitude detector 1512 may determine whether the amplitude Â of the incoming signal is above a predetermined (user-controlled) threshold amplitude Ā (step 2914). As discussed above, a low amplitude may indicate a low flow situation, and a higher amplitude may indicate a normal (higher) flow situation. If the measured amplitude Â is higher than the predetermined threshold level (A), then the low flow prefilter 1514 may be controlled to be "OFF" (step 2916).

In this normal (higher) flow situation, PLL1 1212 will be used to lock quickly into the vortex shedding frequency (steps 2918 and 2920). Once PLL1 1212 has locked into the vortex shedding frequency, its estimated output $f_1$ may be output as the flow measurement signal of the vortex flowmeter 120 (at least until PLL2 1214 can lock into the vortex shedding frequency more accurately) (step 2922).

It may be beneficial to set the center frequency $f$ of PLL2 1214 equal to the frequency estimate $f_1$ of PLL1 1212 to "jump-start" the lock-in of PLL2 1214 once PLL1 1212 is locked in (step 2924). Further, PLL2 1214 may be actively locking in while PLL1 1212 is locking in, if the dual PLL 1510 is designed to have both PLL1 1212 and PLL2 1214 operational and existing concurrently. Next, PLL2 1214 may be checked to see if it is in lock (steps 2926 and 2928). For example, lock indicator LI2 can be used to indicate whether PLL2 1214 is in lock, as discussed above with respect to FIG. 12. If LI2 is "ON," then PLL2 1214 is locked into the vortex shedding frequency input to the electronic processor/transmitter portion 212. Accordingly, if LI2 is "ON," the center frequency $f$ of PLL2 1214 may be controlled to remain at its last value (step 2930), and the output of the vortex flowmeter 120 may be set to be the frequency estimated $f_2$ of PLL2 1214 (step 2932).

Generally, during start-up, the flow of the material will ramp up quickly so as to cause the measured amplitude $Â$ of the vortex shedding signal to be greater than the threshold amplitude A of the amplitude detector 1512. As such, during start-up and during large transients, the exemplary flow rate measurement procedure 2900 may apply steps 2914 through 2932, which make sequential use of both PLL1 1212 and PLL2 1214 to arrive at the flow measurement output.

In low flow rate conditions, it may be appropriate to measure the flow rate using the more accurate, but slower, PLL2 1214. In particular, if the measured amplitude $Â$ (Step 2914) of the incoming signal is below the predetermined (user-controlled) threshold amplitude A, then the low flow prefilter 1514 is controlled to be "ON" (step 2934). At this point, the flow rate is determined to be a low flow rate, and the most appropriate procedure for accurately measuring the flow rate may be to use PLL2 1214 exclusively. Accordingly, the center frequency $f$ of the PLL2 1214 is set to the fixed center frequency $f_0$ of the dual PLL 1510 (step 2936). Further, the estimated output $f_2$ of PLL2 1214 is output as the flow measurement signal of the vortex flowmeter 120 (even when PLL2 1214 has not yet accurately locked into the vortex shedding frequency) (step 2922). PLL2 1214 is continuously checked to see if it is in lock (steps 2926 and 2928). Again, if LI2 is "ON," then PLL2 1214 is locked into the vortex shedding frequency input to the electronic processor/transmitter portion 212. Accordingly, if LI2 is "ON," the center frequency $f$ of PLL2 1214 may be controlled to remain at its last value (step 2930), and the output of the vortex flowmeter 120 may be set to be the frequency estimated $f_2$ of PLL2 1214 (step 2932).

It should be noted that, for example, steps 2914 through 2936 may be repeated, selectively skipped, rearranged, grouped, nested looped, set into subroutines or randomized as appropriate. Furthermore, the steps of the exemplary flow rate measurement procedure 2900 may be supplemented with various other steps for measuring the flow rate of the material through the conduit portions of the process control system 110 with the vortex flowmeter 120.

It should be recognized that while the implementation discussed above relates to a vortex flowmeter having two PLLs, one of which locks faster than the other, the vortex flowmeter could instead include any number of PLLs having different characteristics (e.g., locking speed) with respect to each other. Furthermore, in the case of implementing the PLLs in a DSP, for example, using PLL software processes, it is possible to use a single PLL software process and then merely adjust the software parameters used by the PLL software process to implement each of various faster or slower PLLs. In other words, the PLL software process in a DSP might use a first set of parameters (e.g., values) to implement a fast-lock PLL, estimate the vortex frequency using the fast-lock-PLL-tuned PLL software process, output from the vortex flowmeter the vortex frequency estimated by the fast-lock PLL, tune the PLL software process to implement a slower-lock PLL by changing the parameters used by the PLL software process, use the fast-lock PLL frequency estimate as a starting point center frequency of the slower-lock PLL, and estimate the vortex frequency using the slower-lock-PLL-tuned PLL software process. Once the slower-lock PLL is locked onto the vortex frequency, the DSP can output from the vortex flowmeter the vortex frequency estimated by the slower-lock PLL. Additionally, instead of using a switching software routine or device that switches between the outputs of two actual PLLs (implemented by software or hardware), the "switching" may take the form of changing the parameters used by the PLL software process. Moreover, this process of tuning the PLL software process can be repeated as necessary to implement any number of PLLs having different characteristics.

Furthermore, many of the steps in the exemplary processes shown by FIGS. 27 and 29 can be rearranged, supplemented with other steps, combined or selectively removed.

Self-Validating Sensor Attributes

The vortex flowmeter may be used in a control system that includes self-validating sensors. To this end, the vortex flowmeter may be implemented as a self-validating meter. Self-validating meters and other sensors are described in U.S. Pat. No. 5,570,300, entitled "SELF-VALIDATING SENSORS", which is incorporated by reference.

In general, a self-validating meter provides, based on all information available to the meter, a best estimate of the value of a parameter (e.g., flow rate) being monitored. Because the best estimate is based, in part, on nonmeasurement data, the best estimate does not always conform to the value indicated by the current, possibly faulty, measurement data. A self-validating meter also provides information about the uncertainty and reliability of the best estimate, as well as information about the operational status of the sensor. Uncertainty information is derived from known uncertainty analyses and is provided even in the absence of faults.

A self-validating meter may provide four basic parameters: a validated measurement value (VMV), a validated uncertainty (VU), an indication (MV status) of the status under which the measurement was generated, and a device status. The VMV is the meter's best estimate of the value of a measured parameter. The VU and the MV status are associated with the VMV. The meter produces a separate VMV, VU and MV status for each measurement. The device status indicates the operational status of the meter.

The meter also may provide other information. For example, upon a request from a control system (e.g., a request from the central controller 124), the meter may provide detailed diagnostic information about the status of the meter. Also, when a measurement has exceeded, or is about to exceed, a predetermined limit, the meter can send an alarm signal to the control system. Different alarm levels can be used to indicate the severity with which the measurement has deviated from the predetermined value.

VMV and VU are numeric values. For example, VMV could be a temperature measurement valued at 200 degrees and VU, the uncertainty of VMV, could be 9 degrees. In this case, there is a high probability (typically 95%) that the actual temperature being measured falls within an envelope around VMV and designated by VU (i.e., from 191 degrees to 209 degrees).

In one implementation, the electronic processor/transmitter module of the meter generates VMV based on underlying data from the sensors. First, the electronic processor/transmitter module derives a raw measurement value (RMV) that is based on the signals from the sensor. In general, when the electronic processor/transmitter module detects no abnormalities, the electronic processor/transmitter module has nominal confidence in the RMV and sets the VMV equal to the RMV. When the electronic processor/transmitter module detects an abnormality in the sensor, the electronic processor/transmitter module does not set the VMV equal to the RMV. Instead, the electronic processor/transmitter module sets the VMV equal to a value that the electronic processor/transmitter module considers to be a better estimate than the RMV of the actual parameter.

The electronic processor/transmitter module generates the VU based on a raw uncertainty signal (RU) that is the result of a dynamic uncertainty analysis of the RMV. The electronic processor/transmitter module performs this uncertainty analysis during each sampling period. Uncertainty analysis, originally described in "Describing Uncertainties in Single Sample Experiments," S. J. Kline & F. A. McClintock, *Mech. Eng.*, 75, 3–8 (1953), has been widely applied and has achieved the status of an international standard for calibration. Essentially, an uncertainty analysis provides an indication of the "quality" of a measurement. Every measurement has an associated error, which, of course, is unknown. However, a reasonable limit on that error can often be expressed by a single uncertainty number (ANSI/ASME PTC 19.1-1985 Part 1, Measurement Uncertainty: Instruments and Apparatus).

As described by Kline & McClintock, for any observed measurement M, the uncertainty in M, $w_M$, can be defined as follows:

$$M_{true} \in [M-w_M, M+w_M]$$

where M is true ($M_{true}$) with a certain level of confidence (typically 95%). This uncertainty is readily expressed in a relative form as a proportion of the measurement (i.e. $w_M/M$).

In general, the VU has a non-zero value even under ideal conditions (i.e., a faultless sensor operating in a controlled, laboratory environment). This is because the measurement produced by a sensor is never completely certain and there is always some potential for error. As with the VMV, when the electronic processor/transmitter module detects no abnormalities, the electronic processor/transmitter module sets the VU equal to the RU. When the electronic processor/transmitter module detects a fault that only partially affects the reliability of the RMV, the electronic processor/transmitter module typically performs a new uncertainty analysis that accounts for effects of the fault and sets the VU equal to the results of this analysis. The electronic processor/transmitter module sets the VU to a value based on past performance when the electronic processor/transmitter module determines that the RMV bears no relation to the actual measured value.

To ensure that the control system uses the VMV and the VU properly, the MV status provides information about how they were calculated. The electronic processor/transmitter module produces the VMV and the VU under all conditions—even when the sensors are inoperative. The control system needs to know whether VMV and VU are based on "live" or historical data. For example, if the control system were using VMV and VU in feedback control and the sensors were inoperative, the control system would need to know that VMV and VU were based on past performance.

The MV status is based on the expected persistence of any abnormal condition and on the confidence of the electronic processor/transmitter module in the RMV. The four primary states for MV status are generated according to Table 2.

TABLE 2

Primary states of MV status

| Expected Persistence | Confidence in RMV | MV Status |
|---|---|---|
| not applicable | nominal | CLEAR |
| not applicable | reduced | BLURRED |
| Short | zero | DAZZLED |
| Long | zero | BLIND |

A CLEAR MV status occurs when RMV is within a normal range for given process conditions. A DAZZLED MV status indicates that RMV is quite abnormal, but the abnormality is expected to be of short duration. Typically, the electronic processor/transmitter module sets the MV status to DAZZLED when there is a sudden change in the signal from one of the sensors and the electronic processor/transmitter module is unable to clearly establish whether this change is due to an as yet undiagnosed sensor fault or to an abrupt change in the variable being measured. A BLURRED MV status indicates that the RMV is abnormal but reasonably related to the parameter being measured. For example, the electronic processor/transmitter module may set the MV status to BLURRED when the RMV is a noisy signal. A BLIND MV status indicates that the RMV is completely unreliable and that the fault is expected to persist.

Two additional states for the MV status are UNVALIDATED and SECURE. The MV status is UNVALIDATED when the electronic processor/transmitter module is not performing validation of VMV. MV status is SECURE when VMV is generated from redundant measurements in which the electronic processor/transmitter module has nominal confidence.

The device status is a generic, discrete value summarizing the health of the meter. It is used primarily by fault detection and maintenance routines of the control system. Typically, the device status is in one of six states, each of which indicates a different operational status for the meter. These states are: GOOD, TESTING, SUSPECT, IMPAIRED, BAD, or CRITICAL. A GOOD device status means that the meter is in nominal condition. A TESTING device status means that the meter is performing a self check, and that this self check may be responsible for any temporary reduction in measurement quality. A SUSPECT device status means that the meter has produced an abnormal response, but the electronic processor/transmitter module has no detailed fault diagnosis. An IMPAIRED device status means that the meter is suffering from a diagnosed fault that has a minor impact on performance. A BAD device status means that the meter has seriously malfunctioned and maintenance is required. Finally, a CRITICAL device status means that the meter has malfunctioned to the extent that the meter may cause (or have caused) a hazard such as a leak, fire, or explosion.

One way in which to implement the vortex flowmeter as a self-validating meter is to exploit other signals generated by the vortex flowmeter in addition to the frequency measurement and its associated uncertainty, such as the lock-indicator of PLL1 (LI1), and the lock-indicator of PLL2 (LI2). LI1 and LI2 are combined to give self-validating measurements and metrics VMV and VU measurements. In one implementation, the flow rate measurement Q is found using $Q=Kf_i$, where K L/s/Hz is the calibrating factor, and $f_i$ Hz is the frequency of the vortex shedding. The flow rate measurement Q is associated with an uncertainty $\Delta Q$ so that the true measurement $Q_{true}$ lies in the interval $$Q-\Delta Q \leq Q_{true} \leq Q+\Delta Q$$

with a certain degree of confidence (95%, for example). This interval can be expressed in terms of a relative uncertainty measure $$w_Q = \Delta Q/Q \text{ as } Q(1-w_Q) \leq Q_{true} \leq Q(1+w_Q).$$

Assuming K and $f_t$ are independent, then the uncertainty in the flow rate measurement of the vortex flowmeter can be found using a propagation rule, which gives the following result:

$$\frac{\Delta Q}{Q} = \left(\left(\frac{\delta Q}{\delta K}\right)^2 \left(\frac{\Delta K}{Q}\right)^2 + \left(\frac{\delta Q}{\delta f_1}\right)^2 \left(\frac{\Delta f_1}{Q}\right)^2\right)^{1/2} = \left(\left(\frac{\Delta K}{K}\right)^2 + \left(\frac{\Delta f_1}{f_1}\right)^2\right)^{1/2},$$

which shows that the uncertainty in the flow measurement Q is the sum of the uncertainties in the calibrating K-factor K and the frequency estimate $f_t$, where the uncertainty of $f_t$ can be found by estimating the variance of the frequency from the vortex flowmeter, on-line (95% confidence interval is equal to approximately $2\sigma_f$). The flowmeter calibrating factor and its uncertainty (±0.5% to ±2%) are normally calibrated by the manufacturers, and hence it is invaluable to have a high accuracy process measuring the frequency of the vortex shedding as it reduces the measurement uncertainty of the flow rate.

TABLE 3

MV metrics for the vortex flowmeter

| MV status | LI1 | LI2 | Comments |
|---|---|---|---|
| CLEAR | ON | ON | High-flow rate |
| BLURRED | OFF | ON | Low flow rate |
| BLURRED | ON | OFF | Transients |
| DAZZLED | OFF | OFF | Searching |
| BLIND | — | — | If DAZZLED stays longer than t seconds |

Figure 30:
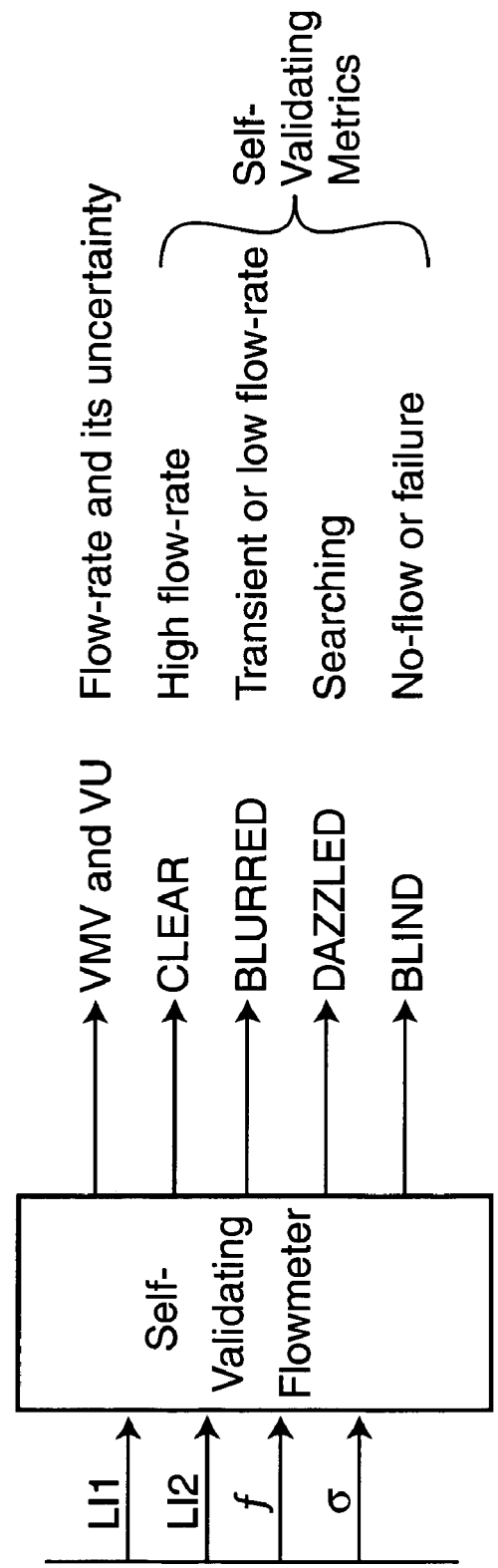
FIG. 30 is a diagram illustrating features of a self-validating flowmeter implementation.

Table 3 summarizes an implementation of MV metrics for the self-validating vortex flowmeter shown in FIG. 30. CLEAR indicates that the VMV measurement is good, and the flow measurements are in the high flow rate region, where the accuracy is expected to be high. The CLEAR signal is generated if LI1 of PLL1 is "ON" and LI2 of PLL2 is "ON." BLURRED indicates that the VMV measurement is good, and the flow measurements is within the low flow rate region or in a transient condition. This signal is generated, for example, when the prefilter 1514 is switched on, and hence when LI1 is "OFF" and LI2 is "ON" (low flow rate) or when LI1 is "ON" and LI2 is "OFF" (transient or start-up). DAZZLED indicates that the VMV measurement is in a search state, and is generated if LI1 and LI2 are both "OFF." BLIND indicates that the VMV measurement is not good, and the flowmeter is unable to provide any measurements due to, for example, a fault in the electronics (e.g., the power supply is off), or caused by no flow passing through the flowmeter. It is simply generated when the DAZZLED state stays for longer than t seconds, where t is a time parameter fixed by the designer.

In another implementation, a single lock indicator signal (e.g., LI2) could be used to generate self-validated uncertainty parameters for the vortex flowmeter. For example, if the lock indicator is ON, then the self-validating meter can indicate a CLEAR MV status, and if the lock indicator is OFF, then the self-validating meter can indicate a DAZZLED MV status. Further, if the lock indicator remains OFF for the predetermined wait-for-recovery amount of time, then the self-validating meter can indicate a BLIND MV status.

A number of implementations have been described. Nevertheless, it will be understood that various modifications may be made. For example, the dual PLL 1510 may be implemented by a combination of hardware (e.g., circuitry) and software (e.g., as a software process in a DSP chip), on an element-by-element basis. As another example, the vortex flowmeter electronic processor/transmitter portion 212 may be implemented having a multiple PLL structure, i.e., more than two PLLs.

What is claimed is:

1. A process variable transmitter, comprising:
    a first phase-locked loop having a first bandwidth producing a first output signal, and operable to lock into a frequency of an input signal;
    a second phase-locked loop having a second band width narrower than the first bandwidth, producing a second output signal, and operable to lock into the frequency of the input signal with greater accuracy and greater immunity to noise than the first phase-locked loop, wherein the second phase-locked loop includes a center frequency input, and the center frequency input is coupled to the first output signal to assist lock-in by the second phase-locked loop; and
    a switch operable to switch an output signal of the process variable transmitter between the first output signal and the second output signal in response to a change in the frequency, and based on at least one of a first lock indicator signal and a second lock indicator signal, wherein the first lock indicator signal indicates whether the first phase-locked loop is locked into the frequency and the second lock indicator signal indicates whether the second phase-locked loop is locked into the frequency.

2. The process variable transmitter of claim 1 wherein:
    the second phase-locked loop generates the second lock indicator signal, and
    the switch switches between the first output signal and the second output signal based on a status or the second lock indicator signal.

3. The process variable transmitter of claim 1 wherein at least one of the first phase-locked loop and the second phase-locked loop comprises:
    a phase sensitive detector operable to receive the input signal and to produce a detector output signal;

a loop filter operable to receive the detector output signal and to produce a filtered signal; and a voltage controlled oscillator operable to receive the filtered signal and to produce an oscillator signal, wherein the phase sensitive detector is further operable to receive the oscillator signal as a feedback signal of the at least one of the first phase-locked loop and the second phase-locked loop.

4. The process variable transmitter of claim 3 wherein the switch and each of the phase sensitive detector, the loop filter and the voltage controlled oscillator of at least one of the first and second phase-locked loops are implemented in a software process.

5. The process variable transmitter of claim 4 wherein the switch and each of the phase sensitive detector, the loop filter and the voltage controlled oscillator of at least one of the first and second phase-locked loops is implemented in the software process on a single digital signal processor chip.

6. The process variable transmitter of claim 3 wherein the phase sensitive detector of at least one of the first and second phase-looked loops comprises a Hilbert transformer.

7. The process variable transmitter of claim 6 wherein the at least one of the first and second phase-locked loops comprises a heterodyning module operable to heterodyne the input signal prior to processing the input signal with the Hilbert transformer.

8. The process variable transmitter of claim 1 further comprising an amplitude detector operable to sense an amplitude of the input signal and to generate a low flow signal when the amplitude of the input signal is below a user-controlled value.

9. The process variable transmitter of claim 8 wherein the switch is coupled to the amplitude detector to receive the low flow signal, and the switch is further operable to select the second output signal as the output signal of the process variable transmitter in response to receiving the low flow signal.

10. The process variable transmitter of claim 1 further comprising a self-validating module operable to generate validated uncertainty parameters including a measurement value and an uncertainty value relating to the quality of the measurement value.

11. The process variable transmitter of claim 10 wherein the validated uncertainty parameters generated by the self-validating module include a measurement status variable.

12. The process variable transmitter of claim 10 wherein the self-validating module is implemented in a software process.

13. The process variable transmitter of claim 1 wherein the process variable transmitter comprises a vortex flowmeter.

14. The process variable transmitter of claim 1 wherein the switch is further operable to select the second output signal as the output signal of the process variable transmitter when the second lock indicator signal indicates that the second phase-locked loop is locked into the frequency.

15. The process variable transmitter of claim 1 wherein the switch is further operable to switch the output signal of the process variable transmitter from the second output signal to the first output signal when the second lock indicator signal indicates that the second phase-locked loop is not locked into the frequency and the first lock indicator signal indicates that the first phase-locked loop is locked into the frequency.

16. A process variable transmitter, comprising: a first phase-locked loop having a first bandwidth producing a first output signal, and operable to lock into a frequency of an input signal; a second phase-locked loop having a second bandwidth narrower than the first bandwidth, producing a second output signal, and operable to lock into the frequency of the input signal with greater accuracy and greater immunity to noise than the first phase-locked loop; a switch operable to switch an output signal of the process variable transmitter between the first output signal and the second output signal in response to a change in the frequency, and based on at least one of a first lock indicator signal and a second lock indicator signal, wherein the first lock indicator signal indicates whether the first phase-locked loop is locked into the frequency and the second lock indicator signal indicates whether the second phase-locked loop is locked into the frequency; an amplitude detector operable to sense an amplitude of the input signal and to generate a low flow signal when the amplitude of the input signal is below a user-controlled value; and a pre-filter operable to filter the input signal prior to processing by at least one of the first phase-locked loop and the second phase-locked loop, and wherein, based on a status of the low flow signal, output signal.

17. A vortex flowmeter comprising:

a flow sensor operable to sense pressure variations due to vortex-shedding of a fluid in a passage and to convert the pressure variations to a flow sensor signal, in the form of an electrical signal having sinusoidal characteristics; and a signal processor operable to receive the flow sensor signal and to generate an output signal corresponding to the pressure variations due to vortex-shedding of the fluid in the passage, the signal processor comprising:

phase-locked loops (PLLs) having different characteristics from each other and operable to receive the flow sensor signal and lock onto the flow sensor signals and produce PLL output signals indicative of the flow sensor signal, at least one of the PLLs having a center frequency input coupled to a PLL output signal of another of the PLLs to assist lock-in by the at least one PLL, and a switch for switching the output signal generated by the signal processor from among the PLL output signals in response to a change in the frequency, and based on one or more lock indicator signals, wherein the one or more lock indicator signals each indicate whether a corresponding phase-locked loop is locked onto the flow sensor signal.

18. The vortex flowmeter of claim 17 wherein the signal processor is implemented by a software process in a digital signal processor chip.

19. The vortex flowmeter of claim 17 wherein a first one of the PLLs is operable to lock onto the flow sensor signal faster than any other PLL, and a second one of the PLLs is operable to lock onto the flow sensor signal with greater accuracy and greater immunity to noise than the first PLL.

20. The vortex flowmeter of claim 19 wherein the switch switches the output signal generated by the signal processor from an output signal of the first PLL to an output signal of the second PLL when the second PLL locks onto the flow sensor signal.

21. The vortex flowmeter of claim 17 further comprising an amplitude detector operable to detect an amplitude of the flow sensor signal, wherein the amplitude detector generates a low flow signal when the amplitude of the flow sensor signal is below a user-controlled value.

22. The vortex flowmeter of claim 21 further comprising a filter operable to filter the flow sensor signal prior to processing by at least one of the PLLs.

23. The vortex flowmeter of claim 22 wherein the filter is switchable between an ON state and an OFF state, and is switched to the ON state based on the low flow signal.

24. The vortex flowmeter of claim 17 wherein the switch is operable to switch the output signal generated by the signal processor from a first of the PLL output signals to a second of the PLL output signals based on a first of the one or more lock indicator signals indicating that the first PLL has lost lock and a second of the one or more lock indicator signals indicating that the second PLL is in lock.

25. A method of determining a flow rate sensed by a vortex flowmeter, the method comprising:
inputting to a signal processor an input signal having sinusoidal characteristics, the signal processor comprising a first phase-locked loop (PLL) having a first bandwidth and a second PLL having a second bandwidth narrower than the first bandwidth;
locking into a frequency of the input signal using the first PLL, the first PLL having a fast loop filter having a large natural frequency to enable the first PLL to lock quickly into the frequency of the input signal;
locking into the frequency of the input signal accurately using the second PLL, the second PLL having a slow loop filter having a small natural frequency to enable the second PLL to lock into the frequency of the input signal more accurately and with greater immunity to noise than the first PLL;
generating a lock indicator signal when the second PLL is locked into the frequency of the input signal;
switching an output of the signal processor from an output signal of the first PLL to an output signal of the second PLL when the lock indicator signal indicates that the second PLL is locked into the frequency of the input signal;
switching the output of the signal processor from the output signal of the second PLL to the output signal of the first PLL when the lock indicator signal indicates that the second PLL is out of lock with the frequency of the input signal; and providing the output signal of the first PLL to the second PLL as a center frequency of the second PLL to assist lock-in by the second PLL.

26. The method of claim 25 further comprising switching the output of the signal processor from the output signal produced by the first PLL to the output signal produced by the second PLL when the input signal indicates low-flow conditions.

27. The method of claim 25 further comprising maintaining a lock into the frequency with the first PLL while switching the output of the signal processor from the output signal of the second PLL to the output signal of the first PLL.

28. A vortex flowmeter comprising:
a flow sensor operable to sense pressure variations due to vortex-shedding of a fluid in a passage and to convert the pressure variations to a flow sensor signal, in the form of an electrical signal having sinusoidal characteristics;
a signal processor operable to receive the flow sensor signal and to generate an output signal corresponding to the pressure variations due to vortex-shedding of the fluid in the passage, the signal processor comprising:
phase-locked loops (PLLs) having different characteristics from each other and operable to receive the flow sensor signal and lock onto the flow sensor signal, and produce PLL output signals indicative of the flow sensor signal, at least one of the PLLs having a center frequency input coupled to a PLL output signal of another of the PLLs to assist lock-in by the at least one PLL, and
a switch for switching the output signal generated by the signal processor from among the PLL output signals, based on one or more lock indicator signals;
an amplitude detector operable to detect an amplitude of the flow sensor signal, wherein the amplitude detector generates a low flow signal when the amplitude of the flow sensor signal is below a user-controlled value; and
a filter operable to filter the flow sensor signal prior to processing by at least one of the PLLs, wherein the filter is switchable between an ON state and an OFF state, and is switched to the ON state based on the low flow signal.

29. A process variable transmitter, comprising:
a first phase-locked loop having a first bandwidth producing a first output signal, and operable to lock into a frequency of an input signal;
a second phase-locked loop having a second bandwidth narrower than the first bandwidth, producing a second output signal, and operable to lock into the frequency of the input signal with greater accuracy and greater immunity to noise than the first phase-locked loop;
a switch operable to switch an output signal of the process variable transmitter between the first output signal and the second output signal;
an amplitude detector operable to sense an amplitude of the input signal and to generate a low flow signal when the amplitude of the input signal is below a user-controlled value; and
a pre-filter operable to filter the input signal prior to processing by at least one of the first phase-locked loop and the second phase-locked loop, and wherein, based on a status of the low flow signal,
a fixed center frequency of the second phase-locked loop is switchable between the first output signal and $2\pi f_{ph}$, where $f_{ph}$ is a high cut-off frequency of the pre-filter,
the pre-filter is switchable between an ON state and an OFF state, and
the switch switches the output signal of the process variable transmitter to the second output signal.

30. A signal processing apparatus for acquiring a frequency of an input signal and producing an output signal, the apparatus comprising:
a first phase-locked loop operable to lock into the frequency of the input signal;
a first lock indicator for generating a first lock indicator signal based on whether the first phase-locked loop is locked into the frequency of the input signal;
a self-validating module operable to generate validated uncertainty parameters based on the first lock indicator signal, wherein the validated uncertainty parameters include a measurement value corresponding to the output signal and art uncertainty value relating to the quality of the measurement value;
a second phase-locked loop operable to lock into the frequency of the input signal; and
a second lock indicator for generating a second lock indicator signal based on whether the second phase-locked loop is locked into the frequency of the input signal,
wherein the self-validating module is operable to generate validated uncertainty parameters based on the first and second lock indicator signals, the validated uncertainty parameters include a measurement status variable, and the measurement status variable is:

CLEAR when both lock indicator signals indicate lock,

BLURRED when one of the two lock indicator signals indicates lock and the other of the two lock indicator signals indicates no lock, DAZZLED when both lock indicator signals indicate no lock, and BLIND when both lock indicator signals indicate no lock for at least a predetermined length of time.

31. A process variable transmitter, comprising: a first phase-locked loop having a first bandwidth producing a first output signal, and operable to lock into a frequency of an input signal; a second phase-locked loop having a second bandwidth narrower than the first bandwidth, producing a second output signal, and operable to lock into the frequency of the input signal with greater accuracy and greater immunity to noise than the first phase-locked loop; and a switch operable to switch an output signal of the process variable transmitter between the first output signal and the second output signal in response to a change in the frequency, and based on at least one of a first lock indicator signal and a second lock indicator signal, wherein the fist lock indicator signal indicates whether the first phase-locked loop is locked into the frequency and the second lock indicator signal indicates whether the second phase-locked loop is locked into the frequency, wherein;

the second phase-locked loop includes a center frequency input, and the center frequency input is coupled to the first output signal to assist lock-in by the second phase-locked loop, the switch is further operable to select the second output signal as the output signal of the process variable transmitter when the second lock indicator signal indicates that the second phase-locked loop is locked into the frequency, and the switch is further operable to switch the output signal of the process variable transmitter from the second output signal to the first output signal when the second lock indicator signal indicates that the second phase-locked loop is not locked into the frequency and the first lock indicator signal indicates that the first phase-locked loop is locked into the frequency.

* * * * *